(12) United States Patent
Iwagami et al.

(10) Patent No.: US 7,469,174 B2
(45) Date of Patent: Dec. 23, 2008

(54) VEHICLE-BORNE ELECTRONIC CONTROL DEVICE

(75) Inventors: Yuki Iwagami, Tokyo (JP); Manabu Yamashita, Tokyo (JP); Kohji Hashimoto, Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 105 days.

(21) Appl. No.: 11/311,469

(22) Filed: Dec. 20, 2005

(65) Prior Publication Data

US 2007/0016337 A1 Jan. 18, 2007

(30) Foreign Application Priority Data

Jul. 15, 2005 (JP) ............ P2005-206944

(51) Int. Cl.
*G05F 3/02* (2006.01)
(52) U.S. Cl. ............ 701/36; 701/99; 323/907
(58) Field of Classification Search ............ 323/907
See application file for complete search history.

(56) References Cited

U.S. PATENT DOCUMENTS

| | | | | | |
|---|---|---|---|---|---|
| 4,417,201 | A | * | 11/1983 | Reddy | 123/490 |
| 4,463,431 | A | * | 7/1984 | Schumaker | 702/66 |
| 4,899,152 | A | * | 2/1990 | Barrow et al. | 341/154 |
| 5,619,122 | A | * | 4/1997 | Kearney et al. | 323/312 |
| 5,671,149 | A | * | 9/1997 | Brown | 702/64 |
| 5,801,594 | A | * | 9/1998 | Muto et al. | 331/158 |
| 5,805,403 | A | * | 9/1998 | Chemla | 361/103 |
| 5,875,388 | A | * | 2/1999 | Daughtry et al. | 455/67.11 |
| 5,892,408 | A | * | 4/1999 | Binder | 331/44 |
| 6,040,736 | A | * | 3/2000 | Milanesi et al. | 327/541 |
| 6,046,551 | A | * | 4/2000 | Kita | 315/307 |
| 6,131,073 | A | | 10/2000 | Honda et al. | |
| 6,191,563 | B1 | * | 2/2001 | Bangerter | 323/211 |
| 6,351,718 | B1 | * | 2/2002 | Shimazu et al. | 702/107 |
| 6,441,679 | B1 | * | 8/2002 | Ohshima | 327/538 |
| 6,476,682 | B1 | * | 11/2002 | Cole et al. | 331/176 |
| 6,591,210 | B1 | * | 7/2003 | Lorenz | 702/99 |
| 6,781,341 | B2 | * | 8/2004 | Nakamichi et al. | 318/685 |
| 6,853,259 | B2 | * | 2/2005 | Norman et al. | 331/66 |
| 7,209,401 | B2 | * | 4/2007 | Norman et al. | 365/212 |

(Continued)

FOREIGN PATENT DOCUMENTS

DE 199 47 115 A 1/2002

(Continued)

*Primary Examiner*—Rick Palabrica
*Assistant Examiner*—Ari M Diacou
(74) *Attorney, Agent, or Firm*—Sughrue Mion, PLLC

(57) ABSTRACT

A constant-voltage power supply circuit unit that is fed from a vehicle-borne battery via a power switch and generates a predetermined constant-voltage output Vcc includes a power transistor and an output voltage regulating circuit unit. The output voltage regulating circuit unit includes a reference voltage generating circuit, a comparison amplifying circuit, a resistance circuit network, a non-volatile second data memory that selectively continues plural open/close elements provided in the resistance circuit network, and a temperature detector. The quantity of variation of output voltage with respect to ambient temperature detected by the temperature detector is estimated, and a setting voltage is corrected to be approximate to a predetermined output voltage, or conversion correction of AD conversion data is performed on the basis of voltage variation characteristics of an analog sensor.

12 Claims, 19 Drawing Sheets

U.S. PATENT DOCUMENTS

| | | | |
|---|---|---|---|
| 2001/0010458 A1* | 8/2001 | Ohshima | 323/282 |
| 2001/0011921 A1* | 8/2001 | Ooishi | 327/540 |
| 2003/0034848 A1* | 2/2003 | Norman et al. | 331/46 |
| 2004/0017112 A1* | 1/2004 | Kim et al. | 307/31 |
| 2004/0150933 A1* | 8/2004 | Nishigaki et al. | 361/103 |
| 2007/0132315 A1* | 6/2007 | Wang et al. | 307/18 |

FOREIGN PATENT DOCUMENTS

| | | | |
|---|---|---|---|
| GB | 2026739 A | * | 2/1980 |
| JP | 05-346827 A | | 12/1993 |
| JP | 08-016265 A | | 1/1996 |
| JP | 2002-366238 A | | 12/2002 |

* cited by examiner

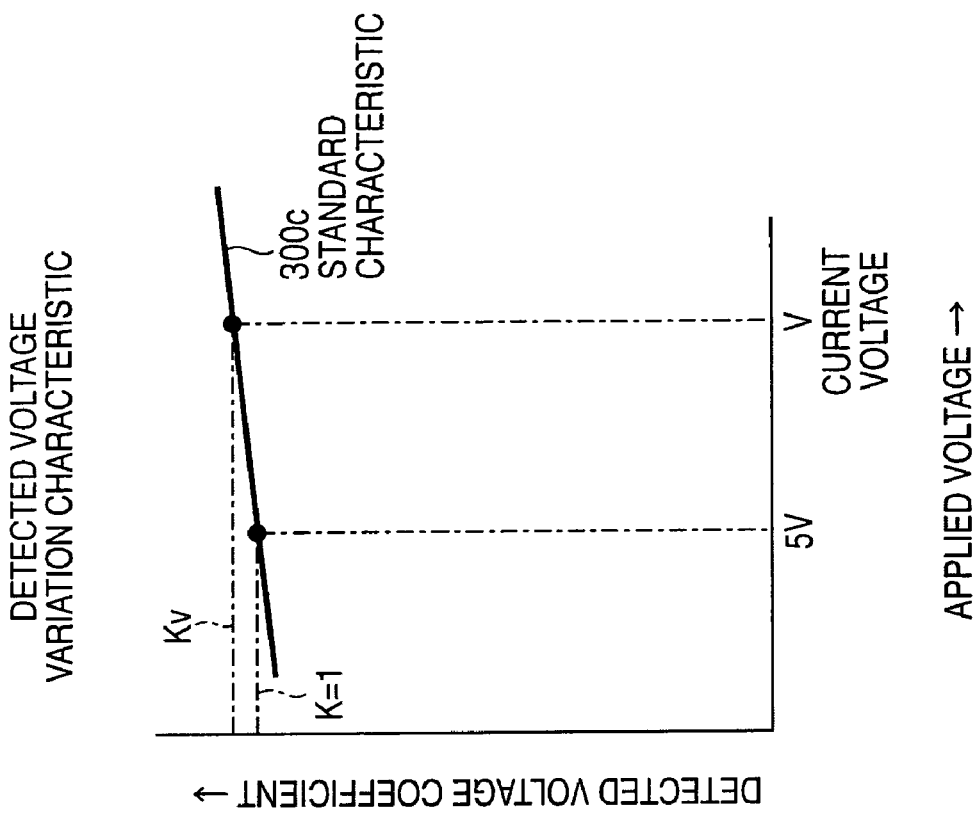
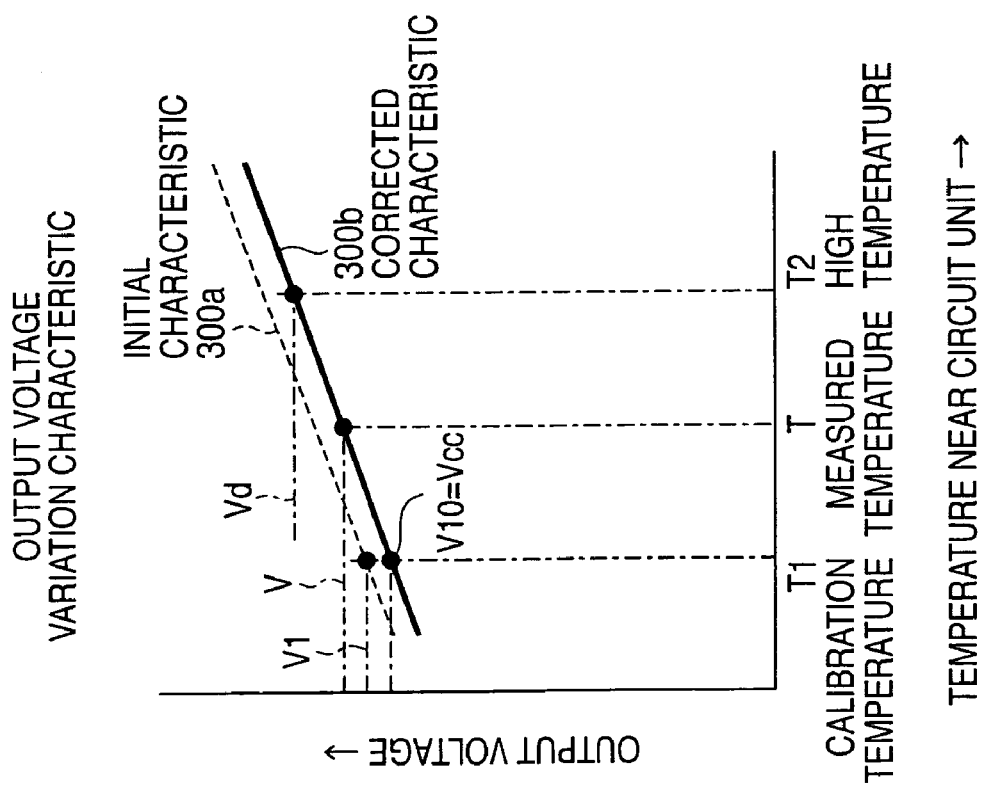

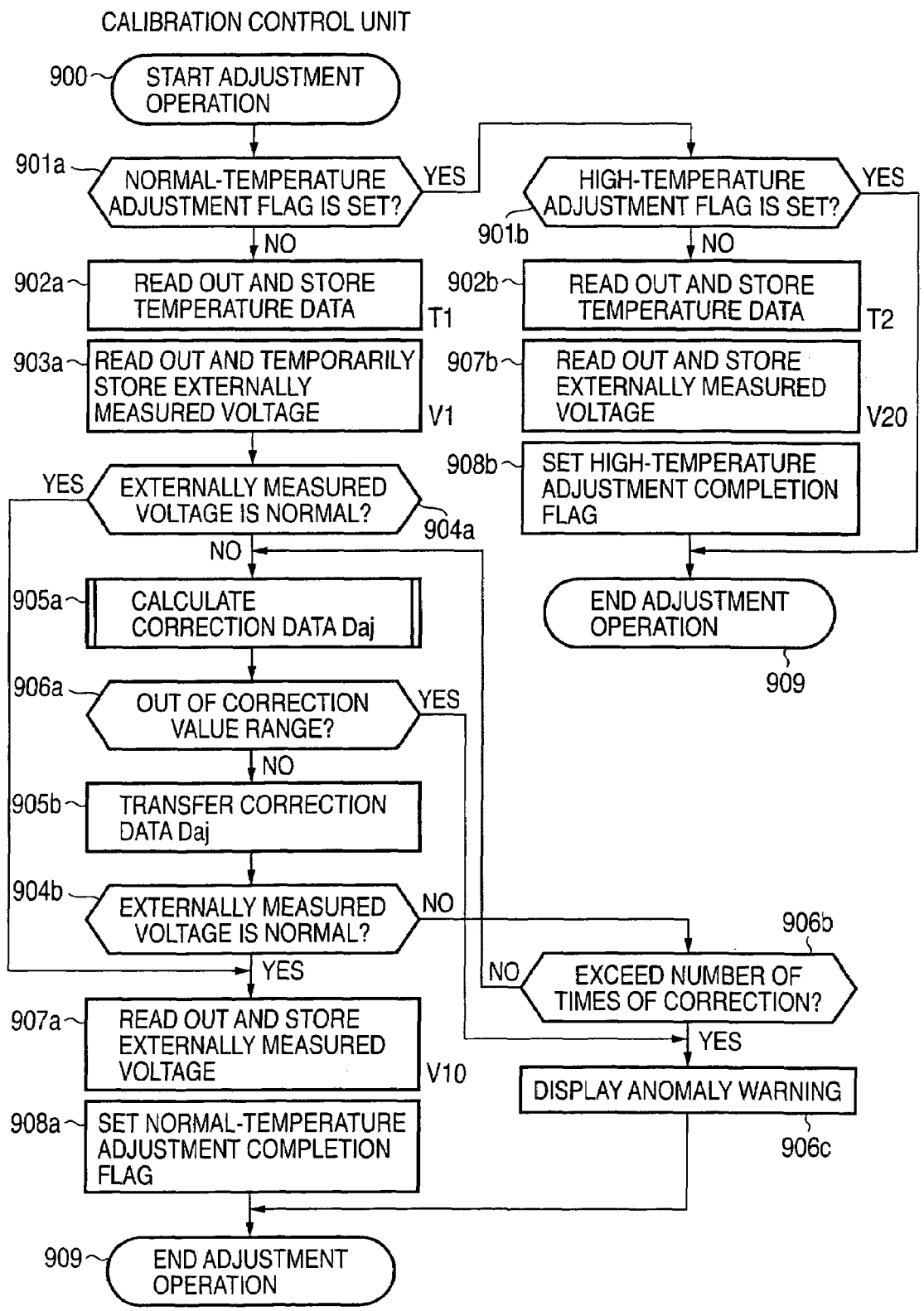

VEHICLE-BORNE ELECTRONIC CONTROL DEVICE

BACKGROUND OF THE INVENTION

1. Field of the Invention

This invention relates to a vehicle-board electronic control device that restrains lowering of AD conversion accuracy due to variation and difference of output voltage from a constant-voltage power supply circuit unit provided in a vehicle-borne electronic control device such as engine control device or transmission control device and feeding at least a multi-channel AD converter and a microprocessor, the constant voltage power supply circuit unit being fed by a vehicle-borne battery to generate a predetermined constant-voltage output.

2. Description of the Related Art

In a vehicle-borne electronic control device, improvement in the constant-voltage control accuracy of a constant-voltage power supply circuit unit provided therein is important, for example, for improving the AD conversion accuracy of a multi-channel AD converter and the generation accuracy of various comparison reference voltages.

However, there is a problem that the constant-voltage power supply circuit unit becomes expensive if a constant-voltage output of extremely high accuracy is to be acquired while difference and variation among individual components used are inevitable.

To avoid this problem, the constant-voltage control accuracy is improved by using a constant-voltage power supply unit having constant-voltage control accuracy lower than an expected value and adding an auxiliary unit to prevent at least the lowering of the constant-voltage control accuracy due to the difference and variations among individual components used.

For example, according to Patent Reference 1, "Circuit Device and Method for Setting Adjustment Data of Circuit Device", in a constant-voltage generator circuit formed as a part of a semiconductor sensor or vehicle engine control unit (ECU), a reference voltage VBGR, which is an output voltage of a reference voltage generator circuit formed by a band gap regulator, is amplified by an operational amplifier to acquire a predetermined constant-voltage output Vcc. Also, adjustment data is written into an EPROM memory to correct the individual difference and variations of the reference voltage VBGR, and the amplification factor of the operational amplifier is increased or decreased by this adjustment data to acquire the predetermined constant-voltage output Vcc.

The device and method according to Patent Reference 1 not only improve the constant-voltage control accuracy but also provide an additional function of adjusting the threshold value of a reset circuit, interlocked with the adjustment data.

Since the constant-voltage output also varies depending on the ambient temperature of the constant-voltage power supply circuit unit, temperature compensation control to restrain this variation is necessarily carried out. However, perfect temperature compensation control is difficult. If temperature compensation of extremely high accuracy is to be performed, the constant-voltage power supply circuit unit becomes expensive. For example, Patent Reference 2, "Stabilized Power Supply Circuit", discloses a technique of generating plural constant-voltage circuits with their output voltages temperature-compensated by using a constant-current circuit having a positive temperature coefficient and a characteristic compensation element having a negative temperature coefficient where a band gap voltage is used. However, 100% temperature compensation cannot necessarily be performed by such band gap circuit.

Patent Reference 1: JP-A-2002-366238 (Paragraph 0009, FIG. 5)

Patent Reference 2: JP-A-8-16265 (FIG. 1, Abstract)

In Patent Reference 1, "Circuit Device and Method for Setting Adjustment Data of Circuit Device", the variation of the output voltage due to the difference and variation among individual components used is corrected by initial adjustment. However, there is a problem that the output voltage varies on the basis of the difference between the ambient temperature at the time of correction and the temperature during the use of the device.

In Patent Reference 2, "Stabilized Power Supply Circuit", the variation of the output voltage is restrained by the temperature compensation control. However, it does not provide sufficient temperature compensation. For example, because of the difference and variation among individual temperature compensation control components, the temperature compensation characteristic changes even in the same control circuit, and individual products output different output voltages.

SUMMARY OF THE INVENTION

It is an object of this invention to provide a vehicle-borne electronic control device having a constant-voltage power supply circuit unit that secures a highly accurate output voltage inexpensively in cooperation with a simple product inspection facility and in which the quantity of variation of output voltage due to at least temperature change can be estimated.

It is another object of this invention to provide a vehicle-borne electronic control device in which errors of AD conversion value can be corrected on the basis of the estimated quantity of variation of output voltage, or the output voltage itself can be regulated properly.

A vehicle-borne electronic control device according to this invention includes a microprocessor that has a non-volatile program memory storing a control program and a control constant transferred and written thereto via an external tool, a non-volatile first data memory in which learning data is stored and saved, and a RAM memory for arithmetic processing. The vehicle-borne electronic control device further includes a constant-voltage power supply circuit unit including a power transistor and an output voltage regulating circuit unit that cooperates with a non-volatile second data memory, a multi-channel AD converter, and a temperature detector. The program memory contains a program to realize a temperature calibration information reading and storing unit, an output voltage estimating unit, and an error correcting unit. The second data memory contains output voltage correction data.

The constant-voltage power supply circuit unit is feed-controlled by a vehicle-borne battery via the power transistor and generates a predetermined constant-voltage output Vcc. The constant-voltage power supply circuit unit feeds at least the microprocessor, the multi-channel AD converter, and an analog sensor group connected to the multi-channel AD converter.

The output voltage regulating circuit unit includes a reference voltage generating circuit that generates a reference voltage Vs, a comparison amplifying circuit that compares the magnitude of a voltage proportional to the output voltage of the constant-voltage power supply circuit unit and the magnitude of the reference voltage Vs, a resistance circuit network that is added to at least one input of the comparison amplifying circuit and fine-tunes a comparison input voltage, and plural open/close elements that are selectively continued in accordance with the contents of the second data memory and change a combined resistance value of the resistance circuit network. The continuity of the power transistor is controlled by the output of the comparison amplifying circuit, and the output voltage is negative-feedback-controlled to be a predetermined constant-voltage output Vcc proportional to the reference voltage Vs. A detection voltage of the analog sensor group is inputted to the multi-channel AD converter. When the analog input voltage of the AD converter becomes equal to a reference voltage Vref supplied from the constant-voltage power supply circuit unit, the multi-channel AD converter generates a maximum digital output of predetermined resolution and selectively inputs digitally converted values of many analog inputs to the microprocessor.

The temperature detector is formed by a thermosensitive element that is installed near the constant-voltage power supply circuit unit and that is fed from the constant-voltage power supply circuit unit to generate a temperature detection voltage corresponding to the temperature near the constant-voltage power supply circuit unit.

The output voltage correction data decides the combined resistance of the resistance circuit network so as to reduce the difference between the output voltage of the constant-voltage power supply circuit unit and a target voltage due to characteristic variation of components applied.

The temperature calibration information reading and storing unit is a unit that writes and saves a digitally converted value of the detection voltage of the temperature detector at least at the time of transfer of the output voltage correction data, as calibration reference temperature data into the first or second data memory.

The output voltage estimating unit is a unit that estimates the current output voltage of the constant-voltage power supply circuit unit by comparing the current detection output of the temperature detector with the calibration reference temperature data stored in the first or second data memory.

The error correcting unit is either an AD conversion value correcting unit that corrects the AD conversion value on the basis of the estimated output voltage and thus corrects an error of AD conversion output data, or an output voltage correcting unit that restrains variation of the output voltage of the constant-voltage power supply circuit unit itself on the basis of the estimated output voltage.

With the vehicle-borne electronic control device according to this invention, the error correcting unit to cope with temperature change is additionally used after the change of the output voltage due to the component variation is calibrated in accordance with the output voltage correction data stored in the second data memory.

Therefore, since the output voltage of the constant-voltage power supply circuit unit is used as the reference voltage of the multi-channel AD converter, it is possible to estimate the output voltage on the basis of the temperature detected by the temperature detector and correct the AD conversion output or to correct a preset voltage and approximate the output voltage of the constant-voltage power supply circuit unit to a target value, even in a structure where the output voltage of the constant-voltage power supply circuit unit cannot be detected. Thus, a voltage detecting circuit and a reference voltage generator circuit that have high accuracy need not be provided and a highly accurate AD conversion output can be acquired with an inexpensive structure.

Moreover, since this correction data is held even at the time of power-off when the vehicle battery is disconnected, once the device is adjusted for shipment, it is not necessary to perform calibration operation using an external tool such as a highly accurate voltmeter.

BRIEF DESCRIPTION OF THE DRAWINGS

FIGS. 3A and 3B are graphs for explaining the calibration control shown in FIG. 2.

FIG. 9 is a flowchart for explaining operations for an adjustment operation in the calibration control shown in FIG. 7.

DETAILED DESCRIPTION OF THE PREFERRED EMBODIMENTS

Embodiment 1 of the Invention (1) Detailed Description of Structure of Embodiment 1

Hereinafter, the overall structure of a device according to a first embodiment of this invention will be described with reference to the block diagram of FIG. 1.

Figure 1:
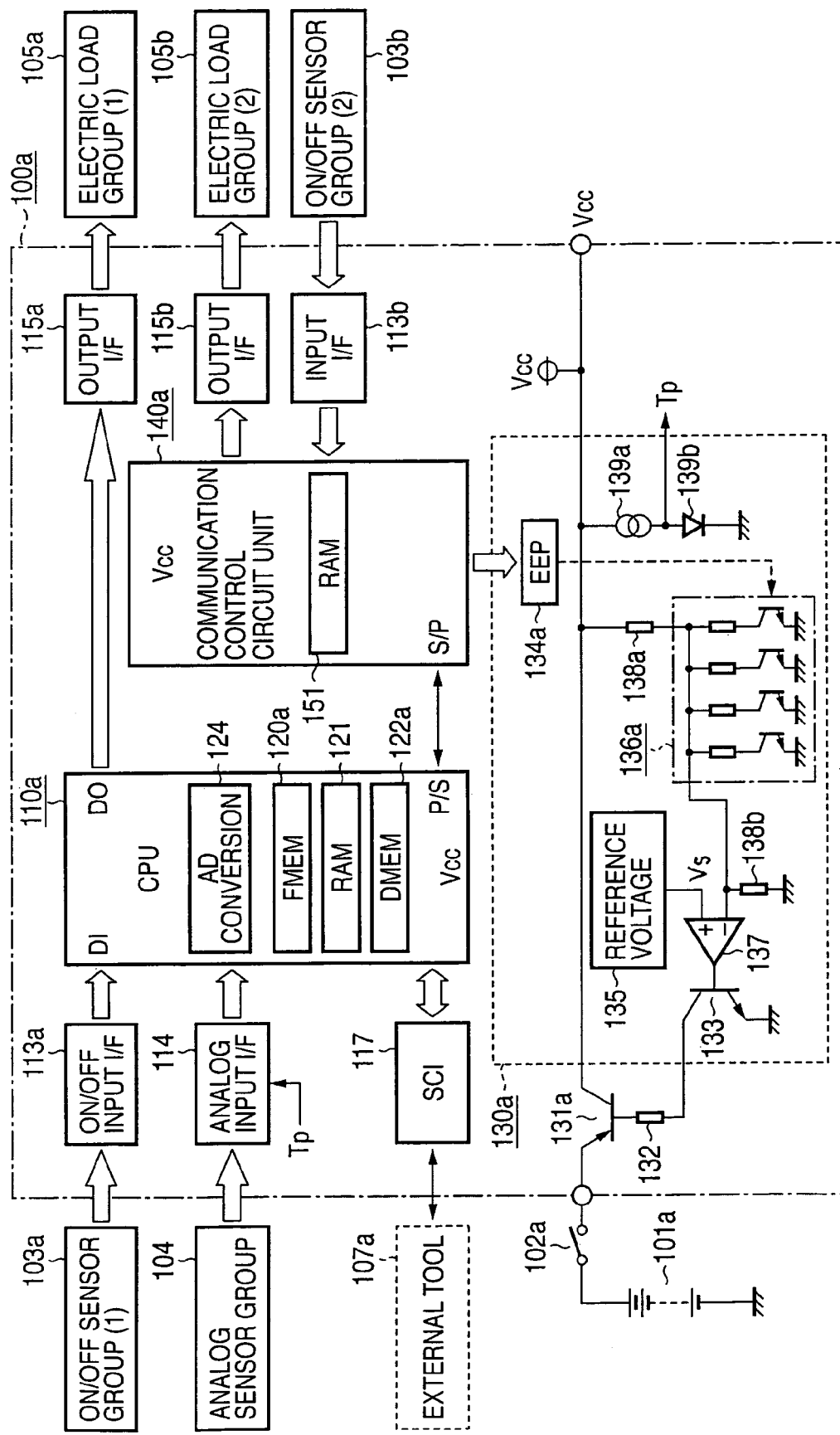
FIG. 1 is a block diagram showing an overall structure of a device according to a first embodiment of this invention.

In FIG. 1, a vehicle-borne electronic control device 100a is mounted on a single electronic board housed in a tightly closed casing, not shown, and is connected to an external input/output device, which will be described hereinafter, via an installation/removal connector, not shown. A vehicle-borne battery 101a generates a DC voltage of, for example, DC 12 V, and feeds the vehicle-borne electronic control device 100a via a power switch 102a such as key switch.

An open/close sensor group 103a is an open/close switch group including sensors that perform relatively frequent operations, for example, engine rotation sensor, crank angle sensor, vehicle speed sensor and the like. An open/close sensor group 103b includes open/close switches that perform less frequent operations, for example, a shift switch that operates in response to a selected position of a gear lever for a transmission, a pedal switch that detects the restoration state of an accelerator pedal and the like.

An analog sensor group 104 includes analog sensors such as an accelerator position sensor that detects the degree of depression of the accelerator pedal, a throttle position sensor, an air flow sensor for an intake throttle valve, a cooling water temperature sensor, and an oil pressure sensor and oil temperature sensor for the transmission.

An electric load group 105a includes electric loads that perform relatively frequency operations, for example, an ignition coil of an engine, an electromagnetic coil for driving an electromagnetic valve for fuel injection, and the like. An electric load group 105b includes electric loads that perform less frequent operations, for example, an electromagnetic coil for driving an electromagnetic valve that controls variable speed stages of an automatic transmission, an electromagnetic clutch for driving an air-conditioning compressor, and the like.

An external tool 107a is a setting and display device connected to the vehicle-borne electronic control device 100a when conducting shipment inspection on the production line of the vehicle-borne electronic control device 100a, shipment inspection on a production line of an automobile, or maintenance and inspection at a service shop.

Next, as the internal structure of the vehicle-borne electronic control device 100a, a microprocessor 110a is an integrated circuit device having a non-volatile program memory 120a formed by a flash memory or the like, a RAM memory 121 for arithmetic processing, a non-volatile first data memory 122a, and a multi-channel AD converter 124.

For the first data memory 122a, a partially divided area of the program memory 120a or an independent EEPROM memory is used.

An input interface circuit 113a is connected between the open/close sensor group 103a and an input port of the microprocessor 110a. It is a circuit including a noise filter circuit, a signal voltage level converting circuit or the like. An input interface circuit 113b is connected between the open/close sensor group 103b and an input port of a communication control circuit unit 140a, which will be described later. It is a circuit including a noise filter circuit, a signal voltage level converting circuit or the like.

An analog interface circuit 114 is a noise filter circuit connected to an analog input terminal of the multi-channel AD converter 124 via the analog sensor group 104 and an analog input port of the microprocessor 110a. An output interface circuit 115a is a power transistor circuit connected between the electric load group 105a and an output port of the microprocessor 110a. An output interface circuit 115b is a power transistor circuit connected between the electric load group 105b and an output port of the communication control circuit unit 140a, which will be described later.

A constant-voltage power supply circuit unit is formed by a power transistor 131a fed by the vehicle-borne battery 101a and an output voltage control circuit unit 130a. The constant-voltage power supply circuit unit generates a constant-voltage output Vcc of, for example, DC 5 V, and feeds the microprocessor 110a, the multi-channel AD converter 124 or the above-described various input/output interface circuits.

The constant-voltage output Vcc may be used as the power supply for the program memory 120a, the RAM memory 121 and the first data memory 122a. However, a stabilized voltage of, for example, DC 3.3 V, generated by a second constant-voltage power supply circuit, not shown, is generally used. The output voltage of this second constant-voltage power supply circuit need not be a stabilized voltage of very high accuracy.

The RAM memory 121 is also fed with a stabilized voltage of, for example, DC 2.7 V, generated by a third constant-voltage power supply circuit, not shown. This third constant-voltage power supply circuit is directly fed by the vehicle-borne battery 101a so that the contents stored in the RAM memory 121 are maintained even when the power switch 102a is opened.

As the constituent elements of the output voltage regulating circuit unit 130a, a transistor 133 controls the continuity of a power transistor 131a via a base resistor 132.

A second data memory 134a is an electrically readable non-volatile memory and can handle data of, for example, 8 bits. A reference voltage generating circuit 135 is formed by, for example, a band gap regulator. It generates a reference voltage Vs of 1.25 V when a power supply voltage of 2 V or higher is supplied.

A resistance circuit network 136a is formed by plural regulating resistors changing at multiplication factors of 1:2:4:8 . . . and open/close elements connected in series with the regulating resistors. The open/close elements are connected to close or open in accordance with the logical level of each output bit of the second data memory 134a.

A comparison amplifying circuit 137 has its output terminal connected to the base terminal of the transistor 133 via a driving resistor, not shown. To its non-inverted input terminal, the reference voltage Vs generated by the reference voltage generating circuit 135 is applied, and to its inverted input terminal, a voltage proportional to the output voltage of the power transistor 131a is applied via the resistance circuit network 136a.

Voltage-dividing resistors 138a and 138b provide reference values to define a proportional coefficient K of the voltage applied to the inverted input terminal of the comparison amplifying circuit 137.

Since the regulating resistors of the resistance circuit network 136a are connected in parallel to the voltage-dividing resistor 138b, the proportional coefficient K can be fine-tuned by changing the combined resistance of the resistance circuit network 136a.

A constant-current circuit 139a is a circuit that is fed from the output terminal of the power transistor 131a and supplies a predetermined constant current to a temperature detector 139b. The temperature detector 139b generates a both-end voltage corresponding to the ambient temperature of the constant-voltage power supply circuit unit. This both-end voltage is inputted as a temperature detection voltage Tp to the multi-channel AD converter 124 via the analog interface circuit 114.

The communication control circuit unit 140a is serially connected with a serial-parallel converter as a main station provided within the microprocessor 110a. The communication control circuit unit 140a includes a serial-parallel converter that carried out signal communication as a sub station, a RAM memory 151, and other logical circuit parts, not shown, and transfers and writes output voltage correction data from the microprocessor 110a to the second data memory 134a.

The communication control circuit unit 140a also sends ON/OFF information of the open/close sensor group 103b to the microprocessor 110a and performs ON/OFF control of the electric load group 105b in accordance with an output control signal from the microprocessor 110a.

Excluding heat-generating components such as large resistor, power transistor and large capacitors, small circuit components of the input interface circuits 113a and 113b, the analog interface circuit 114 and the output interface circuits 115a and 115b, and a serial interface 117 are formed as an integrated circuit device together with the communication control circuit unit 140a and the output voltage regulating circuit unit 130a. The communication control circuit unit 140a sends monitor input information acquired from the open/close sensor group 103b to the microprocessor 110a and also receives a control output signal generated by the microprocessor 110a so as to control driving of the electric load group 105b. This overall structure forms a parallel-usage control circuit unit that cooperates with the microprocessor 110a.

Hereinafter, calibration control in the device shown in FIG. 1 will be described with reference to the block diagram of FIG. 2.

Figure 2:
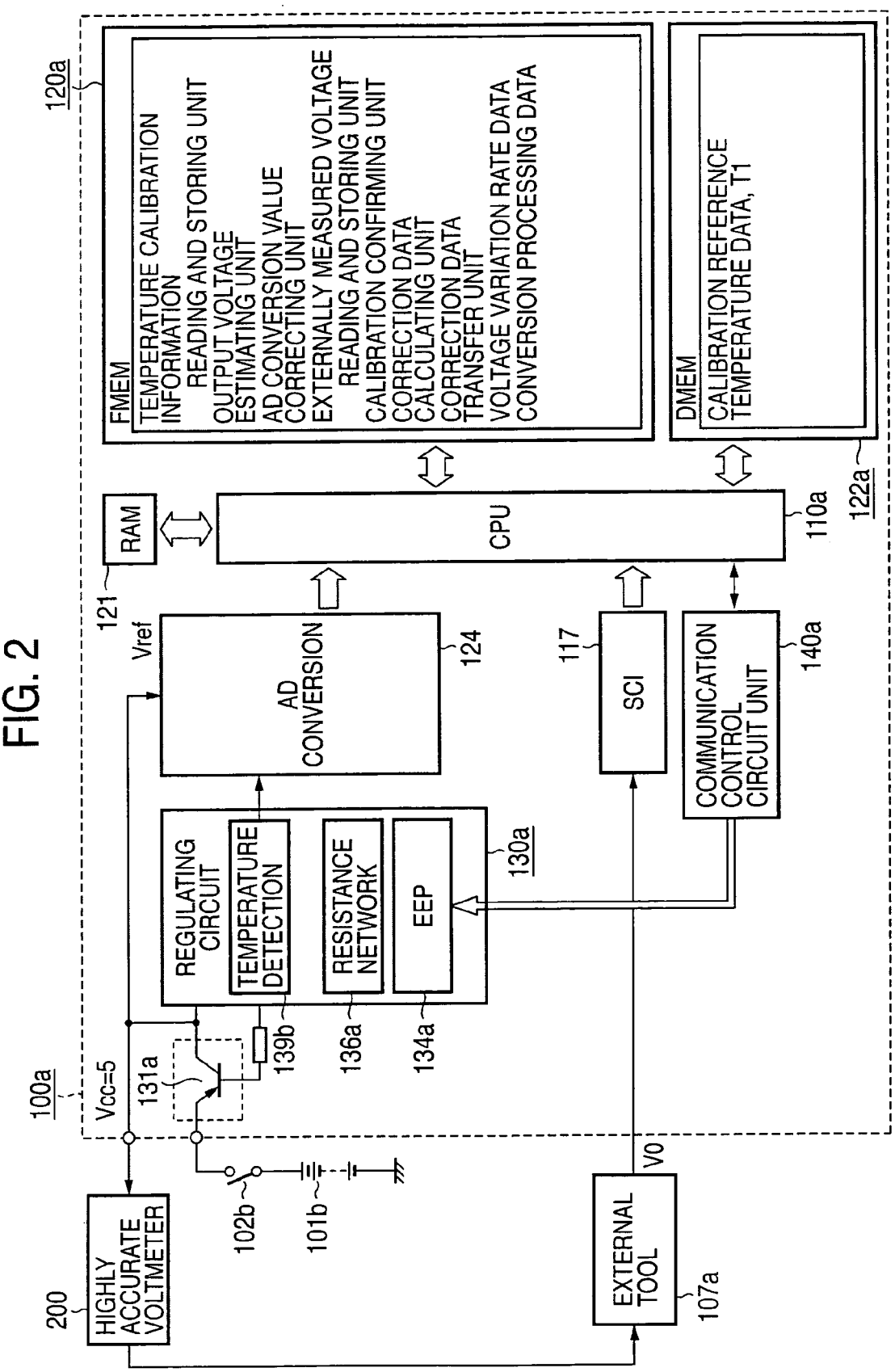
FIG. 2 is a block diagram showing calibration control in the device shown in FIG. 1.

In FIG. 2, an external power supply 101b, which is equivalent to the vehicle-borne battery 101a, is a facility to feed the vehicle-borne electronic control device 100a when performing an adjustment operation via the power switch 102b.

A highly accurate voltmeter 200, which is a facility for the adjustment operation, measures the output voltage of the power transistor 131a in the vehicle-borne electronic control device 100a and sends the digital value of the measured voltage to the RAM memory 121 via the external tool 107a, the serial interface 117 and the microprocessor 110a.

As the reference voltage Vref of the multi-channel AD converter 124 cooperating with the microprocessor 110a, the constant-voltage output Vcc of the constant-voltage power supply circuit unit is used as it is. Therefore, when the input voltage applied to an input terminal of the multi-channel AD converter 124 is Ai, the digitally converted value Di of this input voltage Ai is expressed by the following equations.

$$Di=(Ai/\text{Vref}) \times K=(Ai/Vcc) \times K \quad (1)$$

$$K=2^n-1 \quad (2)$$

However, the exponent n is the number of bits that represents the resolution of the multi-channel AD converter 124. For example, if the multi-channel AD converter 124 has a resolution of 10 bits, K=1023 results.

As is clear from the equation (1), it makes no sense to digitally convert the constant-voltage output Vcc by the multi-channel AD converter 124 of the above-described configuration. If the constant-voltage output Vcc is connected to one input terminal of the multi-channel AD converter 124 and AD conversion is performed thereon, the digitally converted value remains a constant value K no matter how largely the constant-voltage output Vcc changes.

The program memory 120a cooperating with the microprocessor 110a contains a program that provides a calibration control unit, which will be described later with reference to FIGS. 4 and 5, and a program and reference constant data that provide an error correcting unit, which will be described later with reference to FIG. 6.

These program and reference constant data may be stored in the first data memory 122a, which is a non-volatile memory. Generally, however, the first data memory 122a mainly handles learning storage data written and updated during the operation of the vehicle-borne electronic control device 100a.

In the first data memory 122a cooperating with the microprocessor 110a, calibration reference temperature data is stored, which represents the digitally converted value of the output voltage of the temperature detector 139b at the time of calibration of the output voltage of the constant-voltage power supply circuit unit.

To the second data memory 134a provided in the output voltage regulating circuit unit 130a, output voltage correction data is transferred from the microprocessor 110a via the communication control circuit unit 140a. This output voltage correction data is calculated by the microprocessor 110a in a manner shown in FIG. 5.

In FIG. 3A showing variation characteristics of the output voltage of the constant-voltage power supply circuit unit, the horizontal axis represents the temperature near the constant-voltage power supply circuit unit. Calibration temperature T1 is the temperature near the constant-voltage power supply circuit unit detected by the temperature detector 139b when the vehicle-borne electronic control device 100a is in a normal-temperature environment. High temperature T2 is the temperature near the constant-voltage power supply circuit unit detected by the temperature detector 139b when the vehicle-borne electronic control device 100a is in a predetermined high-temperature environment. Measured temperature T is the temperature near the constant-voltage power supply circuit unit detected by the temperature detector 139b when the vehicle-borne electronic control device 100a is at the current ambient temperature. The vertical axis represents the output voltage of the constant-voltage power supply circuit unit, and its target value, that is, the constant-voltage output Vcc is, for example, DC 5 V.

A straight line 300a represents the initial characteristic of the output voltage before initial adjustment. The value of the externally measured voltage measured by the highly accurate voltmeter 200 at the calibration temperature T1 is indicated by V1.

A straight line 300b represents the corrected characteristic of the output voltage after initial adjustment. The output voltage correction data is written to the second data memory 134a so that the value of the externally measured voltage measured by the highly accurate voltmeter 200 at the calibration temperature T1 becomes V10=Vcc (=5 V).

An output voltage Vd is an average output voltage when the temperature near the constant-voltage power supply circuit unit adjusted so that the output voltage becomes Vcc at the calibration temperature T1 has become the predetermined high temperature T2. The value of this output voltage Vd or the value of the gradient (Vd−Vcc)/(T2−T1) is stored in advance in the program memory 120a or the first data memory 122a as voltage variation rate data.

The high temperature T2 may be a temperature different from the calibration temperature T1, and the output voltage variation rate may be found in a predetermined low-temperature environment, and preferably in both low- and high-temperature environments. An estimated output voltage V is acquired by calculating the output voltage at the current measured temperature T by interpolation from the relation of V10 (=Vcc) versus T1 and Vd versus T2.

The value of the output voltage Vd or the value of the gradient (Vd−Vcc)/(T2−T1), which is the voltage variation rate data, is acquired by actually measuring the value for many products and taking the statistical average value. Therefore, the value can be slightly different from the actual value acquired from a subject product. However, advantageously, the adjustment for shipment of the actual product need not be carried out in a high-temperature or low-temperature environment and it suffices to carry out the adjustment only in a normal-temperature environment.

In FIG. 3B showing variation characteristics of applied voltage versus detected voltage of the analog sensor, the horizontal axis represents the output voltage of the constant-voltage power supply circuit unit as a power supply voltage fed and applied to the analog sensor, and the vertical axis represents the variation coefficient of the detected voltage of the analog sensor.

For example, an air flow sensor provided in an intake duct generates a predetermined detected voltage for a predetermined applied voltage Vcc and a predetermined quantity of air intake. However, when the applied voltage changes, the detected voltage changes even if the quantity of air intake is the same.

A straight line 300c represents the average detected voltage variation characteristic of many air flow sensors. It shows that a detected voltage of Kv times is generated at the current applied voltage V. Therefore, when the estimated output voltage of the constant-voltage power supply circuit unit is V, the detection output of the air flow sensor needs correction such as being divided by the coefficient Kv or the like.

In the case where the analog sensor is, for example, a potentiometer for detecting the degree of depression of the accelerator pedal, when the voltage applied to the potentiometer increases, the detection output, which is the rotation angle of the potentiometer, also increases in proportion to the applied voltage.

In this case, since the reference voltage Vref of the AD converter proportionally increases, too, as expressed by the equation (1), the detected digitally converted value is always a value proportional to the rotation angle of the potentiometer irrespective of the power supply voltage Vcc=Vref. Thus, voltage variation compensation need not be carried out.

However, with respect to an analog sensor in which the detected voltage is not proportional to the power supply voltage, unlike the one shown in FIG. 3B, or an analog sensor in which a predetermined detected output voltage (voltage proportional to the physical quantity of a detection subject) is generated irrespective of the variation of the power supply voltage, the digitally converted value decreases as the power supply voltage increases. Therefore, voltage variation compensation must be carried out in consideration of both the variation characteristic and AD conversion characteristic of the detected voltage.

Conversion processing data acquired in consideration of both the variation characteristic and AD conversion characteristic of the detected voltage is stored in the program memory 120a or the first data memory 122a as conversion processing data for each analog sensor that needs correction.

(2) Detailed Description of Effects and Operations of Embodiment 1

Next, operations in the calibration control block constructed as shown in FIG. 2 will be described with reference to the flowcharts of FIGS. 4 and 5.

Prior to the adjustment operation, various programs are transferred from the external tool 107a to the program memory 120a in accordance with a boot program, not shown, cooperating with the microprocessor 110a. The programs transferred here include a communication control program, an input/output control program, basic information such as control constant data, as well as programs and reference data to provide a calibration control unit and an error correcting unit.

Figure 4:
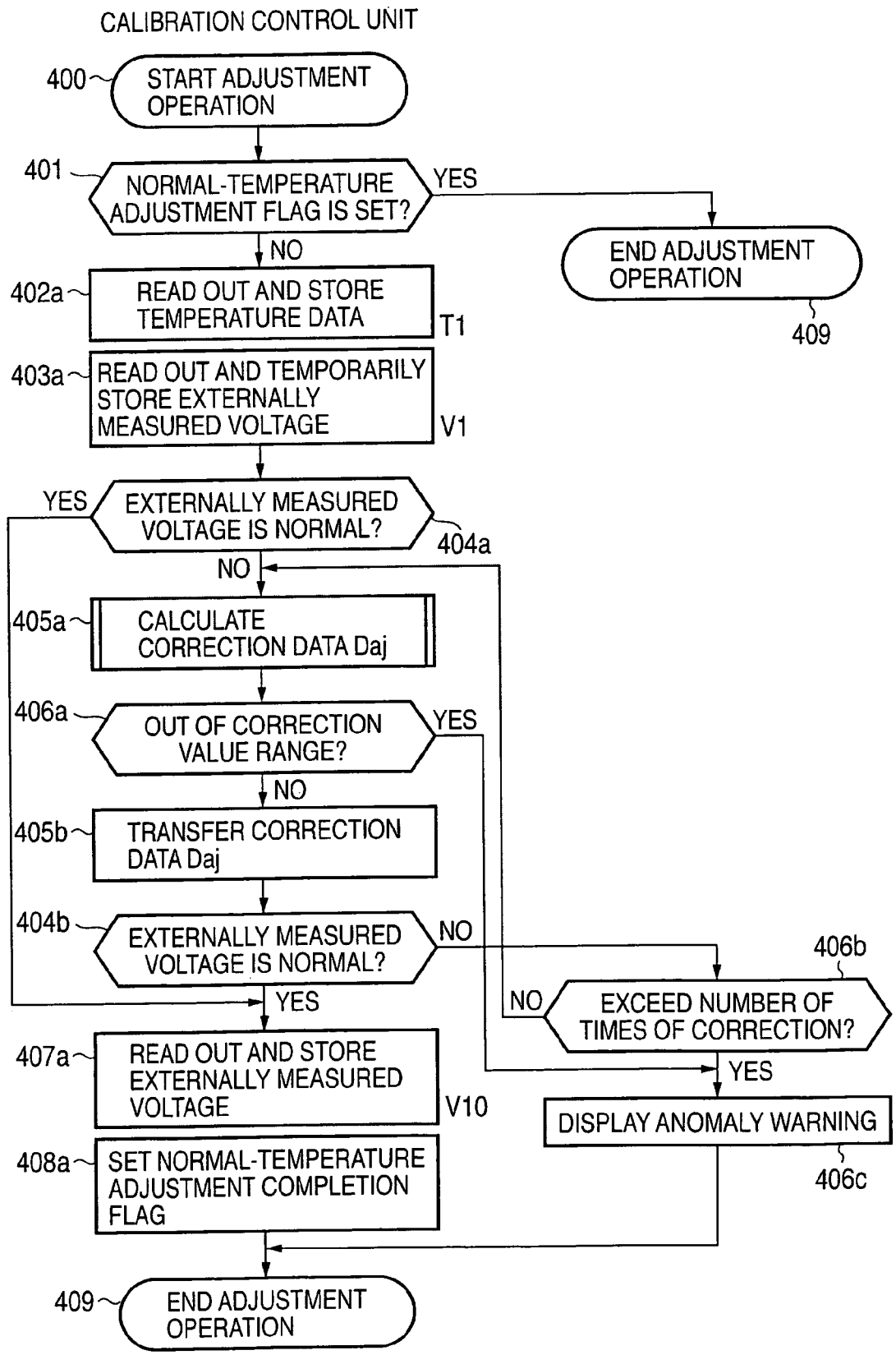
FIG. 4 is a flowchart for explaining operations for an adjustment operation in the calibration control shown in FIG. 2.

In FIG. 4, at step 400, as the power switch 102b is closed and the external tool 107a is connected so that an adjustment operation mode is selected, the microprocessor 110a starts the adjustment operation. At the next step 401, it is judged whether a normal-temperature adjustment completion flag is set at step 408a, which will be described later. If the flag is already set, the processing shifts to operation end step 409. If the flag is not set, the processing shifts to step 402a.

At step 402a, the digitally converted value of the temperature detection voltage Tp detected by the temperature detector 139b is read out and stored into the first data memory 122a as calibration reference temperature data T1.

At the next step 403a, the measured voltage of the highly accurate voltmeter 200 is read out and temporarily stored into the RAM memory 121 via the external tool 107a. At the next step 404a, it is judged whether the differential voltage ΔV=V1−5 between the externally measured voltage V1 read out and temporarily stored at step 403a and the true target value of the constant-voltage output Vcc, for example, DC 5 V, is a normal value within a predetermined threshold range. If it is a normal value, the processing shifts to step 407a. If it is not a normal value, the processing shifts to step block 405a.

At step block 405a, output voltage correction data (hereinafter simply referred to as correction data Daj or correction value Daj) is calculated in accordance with the differential voltage ΔV=V1−5, as will be described later with reference to FIG. 5.

If, for example, six regulating resistors are provided in the resistance circuit network 136a and a 6-bit correction value Daj is to be written to the second data memory 134a, the correction value Daj is within a range of 0 to 63. As a design theoretical value, a correction value Daj=30 is selected when the differential voltage ΔV=V1−5 is 0 V. If the differential voltage ΔV=V1−5 increases, the correction value Daj is decreased to increase the combined resistance of the resistance circuit network 136a. If the differentia voltage ΔV=V1−5 decreases, the correction value Daj is increased to decrease the combined resistance of the resistance circuit network 136a. Thus, the negative feedback voltage applied to the inverted input terminal of the comparison amplifying circuit 137 is increased or decreased.

At step 406a following step block 405a, it is judged whether the correction value Daj calculated at step 405a is out of an appropriate range of, for example, 2 to 61. If it is out of the range, the processing shifts to step 406c. If it is not out of the range, the processing shifts to step 405b. The circuit constant is so designed that the correction value Daj does not fall out of the range of 2 to 61 unless a product anomaly occurs.

At step 405b, the correction value Daj calculated at step block 405a is transferred to the second data memory 134a. At the next step 404b, it is judged whether the differential voltage between the externally measured voltage V10 based on the correction value Daj transferred at step 405b and the true target value of the constant-voltage output Vcc, for example, DC 5 V, is a normal value within a predetermined threshold range. If it is a normal value, the processing shifts to step 407a. If it is not a normal value, the processing shifts to step 406b.

At step 406b, it is judged whether the number of times of correction at step block 405a has exceeded a predetermined number of times. If it has not exceeded the predetermined number of times, the processing returns to step block 405a. If it has exceeded the predetermined number of times, the processing shifts to step 406c. At step 406c, an anomaly warning display command is issued to the external tool 107a and then the processing shifts to operation end step 409.

Step 407a is executed when the result of the judgment at step 404a or 404b is YES and the differential voltage between the externally measured voltage and the true target value of the constant-voltage output Vcc, for example, DC 5 V, is a normal value within a predetermined threshold range. At step 407a, the value of the externally measure voltage V10 is read out and stored. Practically, V10 is approximately equal to Vcc. Therefore, it is not particularly necessary to read out and store the value, as a matter of convenience.

At the subsequent step 408a, a normal-temperature adjustment completion flag is set and it is stored that the calibration completion state has been set. At the subsequent step 409, execution standby for the other control programs of the microprocessor 110a is performed. After that, operation start step 400 is activated again and the subsequent steps are repeated.

To summarize the operation flow of the adjustment operation described above, step 402a provides a temperature calibration information reading and storing unit that reads out and stores the calibration reference temperature. Step 403a provides an externally measured voltage reading and storing unit. Steps 404a and 404b provide a calibration confirming unit. Step block 405a provides a correction data calculating unit. Step 405b provides a correction data transfer unit. Step 406a provides a correction value limiting unit. Step 406b provides a re-transfer unit (number-of-times-of-correction limiting unit). Step 406c provides an anomaly notifying unit.

Figure 5:
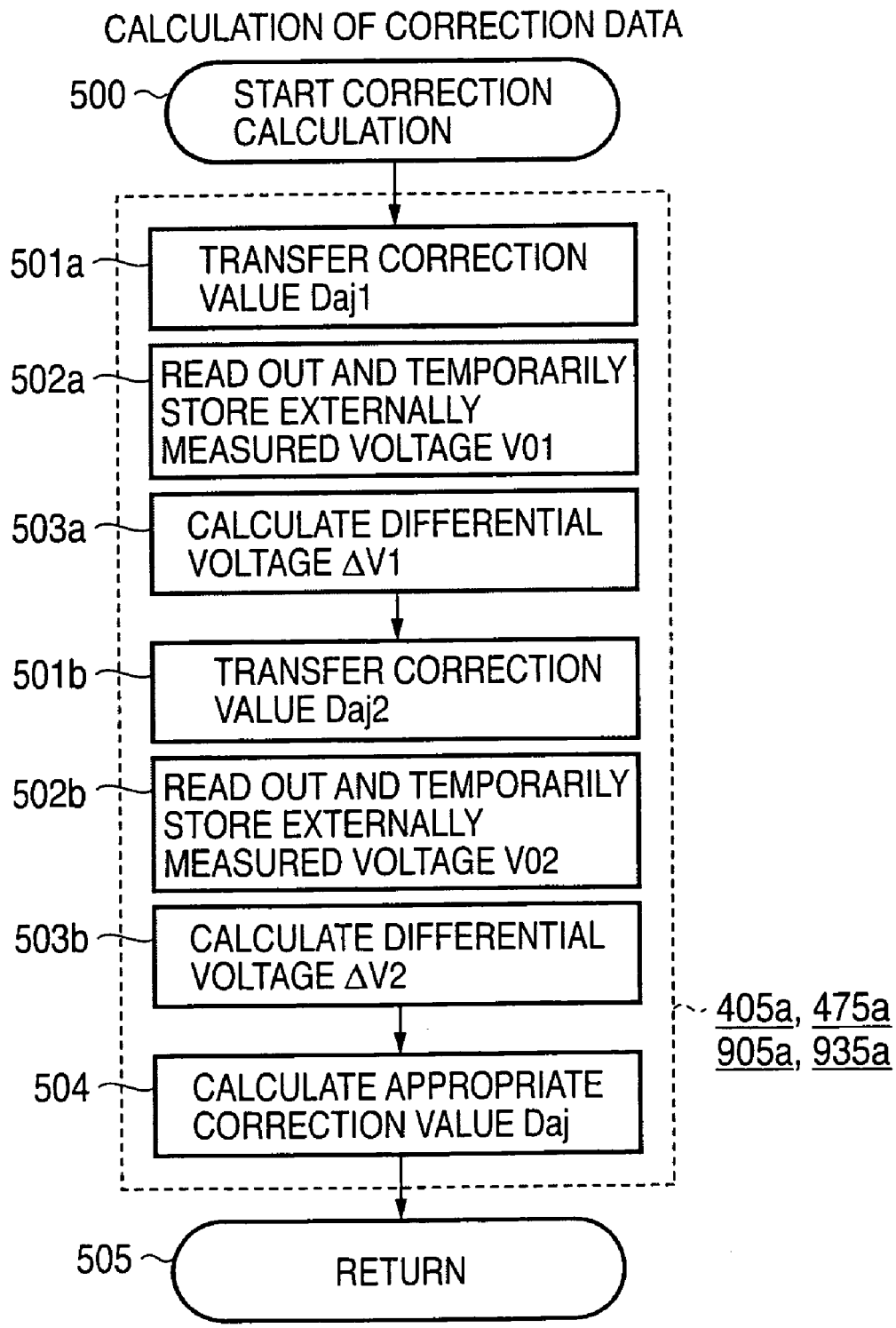
FIG. 5 is a flowchart showing the details of a part of the operation shown in FIG. 4.

In FIG. 5 showing the details of step block 405a of FIG. 4, step 500 is an operation start step of a subroutine program that is executed when the result of the judgment at step 404a of FIG. 4 is NO or when the result of the judgment at step 406b is NO. At the next step 501a, first output voltage correction data Daj1 is transferred as a temporary value to the second data memory 134a. At the next step 502a, an externally measure voltage V01 measured by the highly accurate voltmeter 200 corresponding to the correction data Daj1 is read into the RAM memory 121. At the next step 503a, the differential voltage ΔV1=V01−5 between the externally measured voltage V01 and the target output voltage 5 V is calculated and stored. At the next step 501b, second output voltage correction data Daj2 is transferred as a temporary value to the second data memory 134a. At the next step 502b, an externally measured voltage V02 measured by the highly accurate voltmeter 200 corresponding to the correction data Daj2 is read into the RAM memory 121. At the next step 503b, the differential voltage ΔV2=V02−5 between the externally measured voltage V02 and the target output voltage 5 V is calculated and stored. At the next step 504, interpolation from the differential voltages ΔV1 and ΔV2 corresponding to the correction data Daj1 and Daj2 is performed and correction data Daj to realize the differential voltage ΔV equal 0 is calculated. The next step 505 is a return step to shift to step 406a of FIG. 4.

Figure 13:
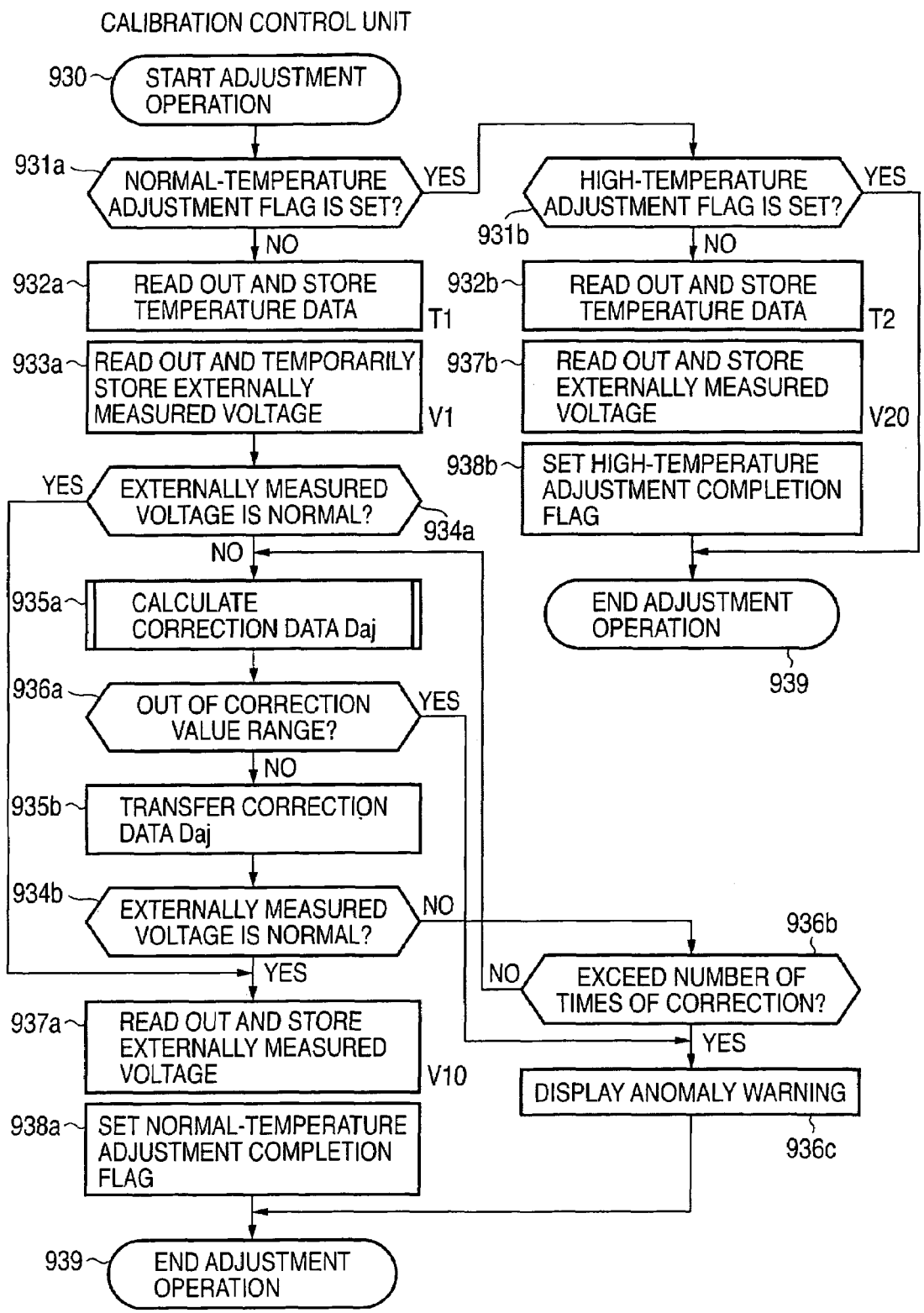
FIG. 13 is a flowchart for explaining operations for an adjustment operation in the component inspection shown in FIG. 12.
Figure 17:
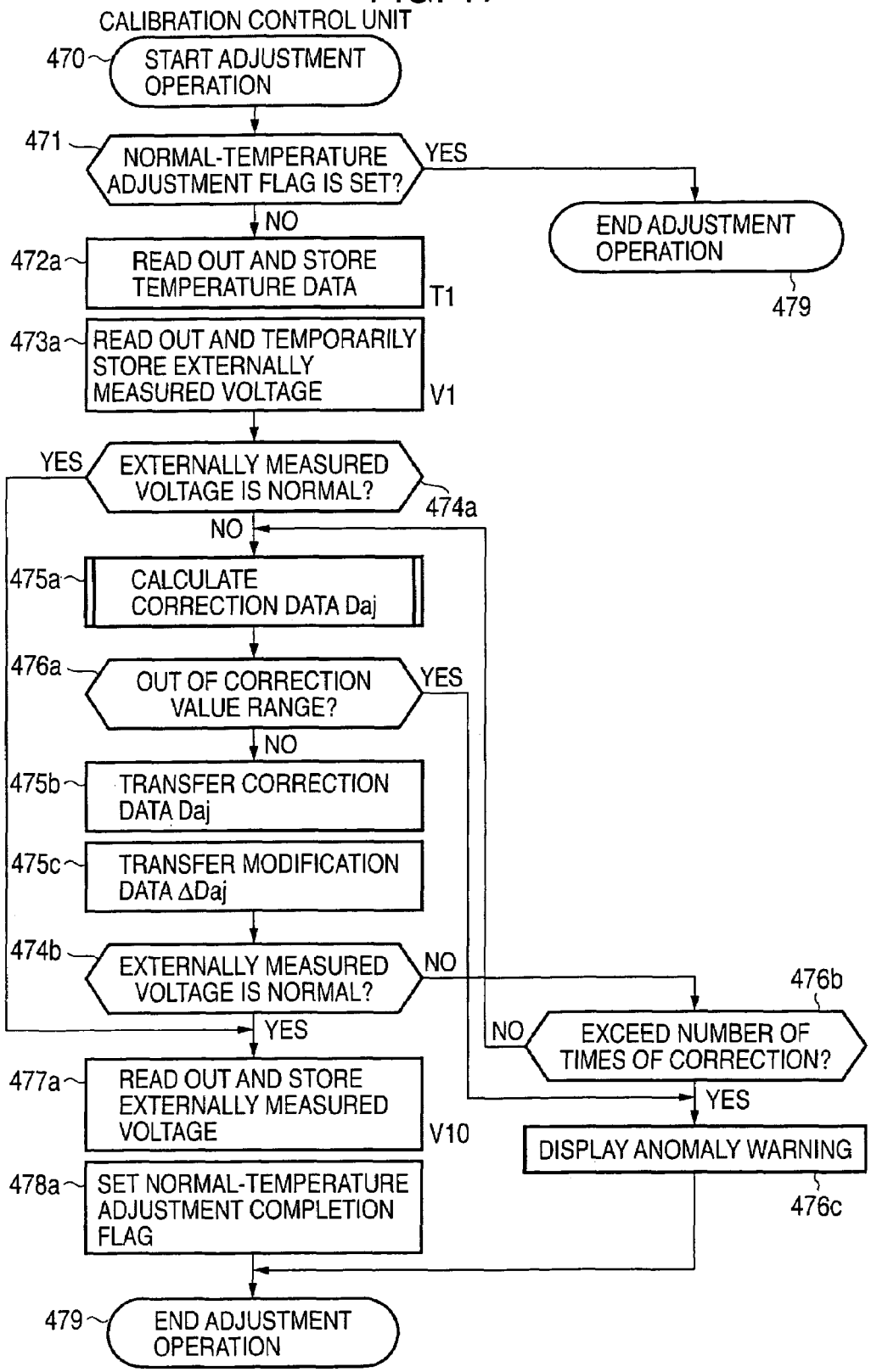
FIG. 17 is a flowchart for explaining operations for an adjustment operation in the calibration control shown in FIG. 16.

Step block 405a is also used as step block 905a in FIG. 9, step block 935a in FIG. 13, and step block 475a in FIG. 17. When calculating correction data again via step 406b, more accurate interpolation is performed with reference to the differential voltage V corresponding to the output voltage correction data Daj that is already applied.

Now, the operation of the error correcting unit in the vehicle-borne electronic control device 100a constructed as shown in FIG. 1 will be described with reference to the flowchart of FIG. 6. Prior to the driving operation, various programs are transferred from the external tool 107a to the program memory 120a. After the adjustment operation shown in FIGS. 4 and 5 is carried out, the external tool 107a is disconnected, or the adjustment operation mode is canceled to shift to the monitor mode by operating the keyboard in the external tool 107a.

Figure 6:
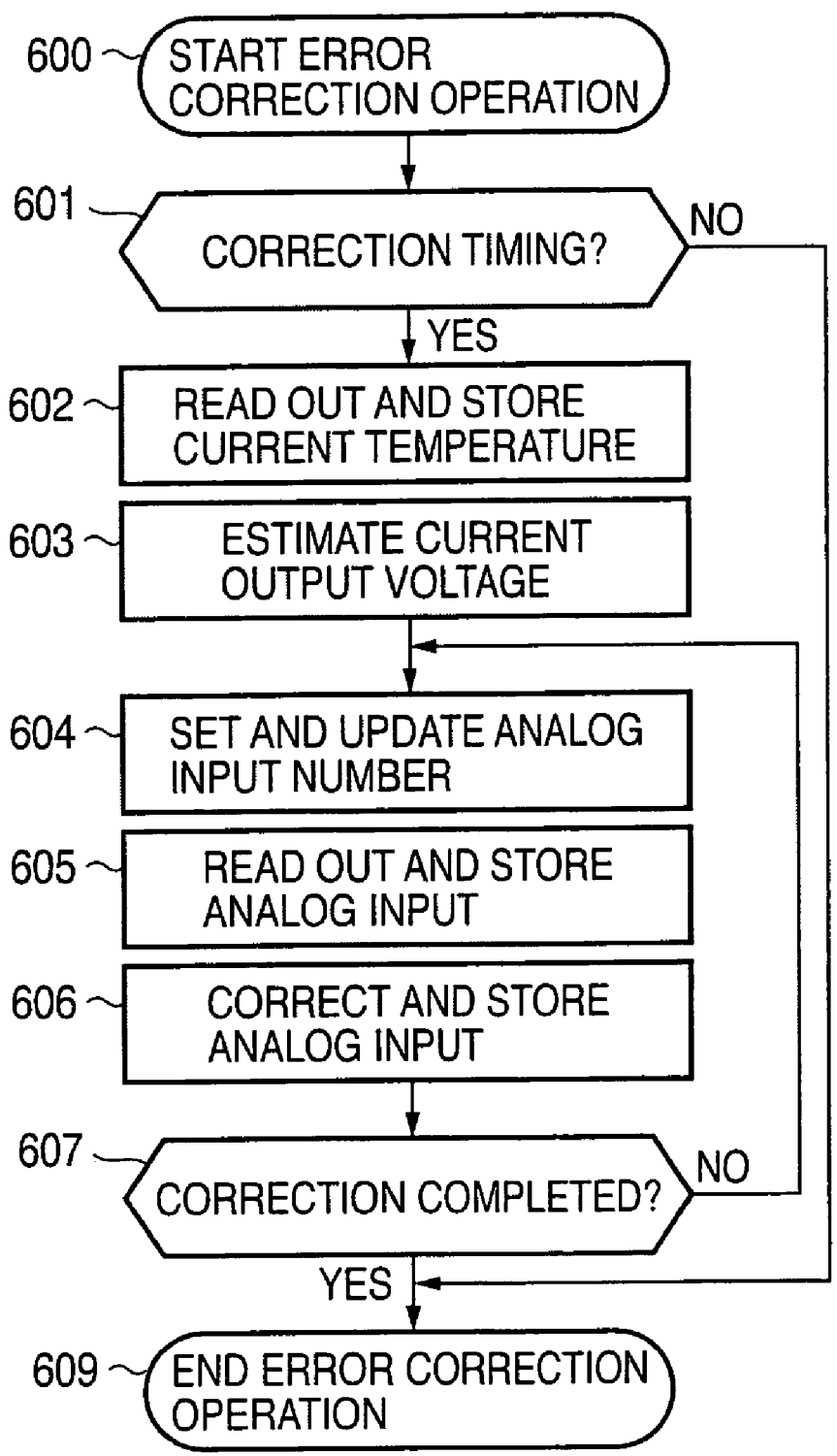
FIG. 6 is a flowchart for explaining a correction operation during the operation of the device shown in FIG. 1.

In FIG. 6, at step 600, as the power switch 102a is closed, the microprocessor 10a starts the error correction operation. At the next step 601, it is judged whether it is the error correction timing now or not. If it is not the error correction timing, the processing shifts to operation end step 609. If it is the error correction timing, the processing shifts to step 602.

The result of the judgment of the error correction timing at step 601 is YES, for example, at the time of initial operation immediately after the power switch 102a is closed. After the power switch 102a is closed, the result of judgment becomes YES every predetermined cycle.

At step 602, the current measured temperature T measured by the temperature detector 139b is read out and stored into the RAM memory 121. At the next step 603, the current output voltage indicated by the straight line 300b in FIG. 3A is calculated and stored as an estimated output voltage V to the RAM memory 121.

At the subsequent step 604, the number of the analog sensor that requires correction processing as indicated by the straight line 300c in FIG. 3B is set. At the next step 605, the digital value acquired by converting the input voltage of the analog sensor of that number by the multi-channel AD converter 124 is read out and stored into the RAM memory 121. At the next step 606, the conversion processing data related to the analog sensor of that number, stored in advance in the program memory 120a or the first data memory 122a, is read out, and the digitally converted value read out and stored at step 605 is corrected and stored as an error correction digital value to the RAM memory 121. At the subsequent step 607, it is judged whether the error correction processing is completed with respect to all the analog sensors that require correction processing. If it is not completed, the processing shifts to step 604 and the sensor number is updated. If it is completed, the processing shifts to operation end step 609.

At operation end step 609, the microprocessor 110a executes the other control operations. As a predetermined time passes, operation start step 600 is activated and the subsequent steps are repeated.

In the above-described flow of error correction operation, step 603 provides the output voltage estimating unit described with reference to FIG. 3A, and step 606 provides the AD conversion value correcting unit described with reference to FIG. 3B. The calibration control program and the error correction control program, which are control programs corresponding to the control flows shown in FIGS. 4, 5 and 6, and the voltage variation rate data and the conversion processing data, which are reference control constants, are stored in the program memory 120a. The calibration reference temperature data is stored in the first data memory 122a. The output voltage correction data is stored in the second data memory 134a. However, it is also possible to delete the calibration control program shown in FIGS. 4 and 5, execute the calibration control by the external tool 107a. The microprocessor 110a may simply write and save the reference control constants, the calibration reference temperature data and the output voltage correction data sent from the external tool 107a, into the program memory 120a, the first data memory 122a and the second data memory 134a. The microprocessor 110a may simply execute the error correction control unit of FIG. 6, which is the operation during the actual operation of the vehicle-borne electronic control device 100a.

The correction data calculating unit shown in FIG. 5 employs the interpolation technique using the two virtual correction values Daj1 and Daj2. However, it is also possible to calculate the correction data, using a conversion formula acquired by actually measuring, in advance, an appropriate correction value Daj corresponding to the actually measured differential voltage ΔV with respect to many products and storing the actually measured correction value as statistical data.

(3) Description of Construction and Features of Embodiment 1

As is clear from the above description, the vehicle-borne electronic control device 100a according to Embodiment 1 of this invention includes the microprocessor 110a that has the non-volatile program memory 120a and the first data memory 122a storing the control programs and control constants transferred and written via the external tool 107a and that also has the RAM memory 121 for arithmetic processing. The vehicle-borne electronic control device 100a also has the constant-voltage power supply circuit unit, the output voltage regulating circuit unit 130a cooperating with the non-volatile second data memory 134a, the multi-channel AD converter 124, and the temperature detector 139b. The program memory 120a contains the programs that provide the temperature calibration information reading and storing unit 402a described with reference to FIG. 4 and the output voltage estimating unit 603 and the error correcting unit described with reference to FIG. 6. The second data memory 134a contains the output voltage correction data.

The constant-voltage power supply circuit unit is feed-controlled from the vehicle-borne battery 101a via the power transistor 131a, generates a predetermined constant-voltage output Vcc, and feeds at least the microprocessor 110a, the multi-channel AD converter 124, and the analog sensor group 104 connected to the multi-channel AD converter 124.

The output voltage regulating circuit unit 130a includes the reference voltage generating circuit 135 that generates a reference voltage Vs, the comparison amplifying circuit 137 that compares the magnitude of a voltage proportional to the output voltage of the constant-voltage power supply circuit unit with the magnitude of the reference voltage Vs, the resistance circuit network 136a that is added to at least one input of the comparison amplifying circuit 137 and fine-tunes the comparison input voltage, and the plural open/close elements that are selectively continued in accordance with the contents stored in the second data memory 134a and change the combined resistance value of the resistance circuit network 136a. The continuity of the power transistor 131a is controlled by the output of the comparison amplifying circuit 137. The output voltage is negative-feedback-controlled so that a predetermined constant-voltage output Vcc proportional to the reference voltage Vs is acquired.

The detected voltage from the analog sensor group 104 is inputted to the multi-channel AD converter 124. When the analog input voltage of the AD converter becomes equal to the reference voltage Vref supplied from the constant-voltage power supply circuit unit, the multi-channel AD converter 124 generates a maximum digital output of predetermined resolution and selectively inputs digitally converted values of many analog inputs to the microprocessor 110a.

The temperature detector 139b is installed near the constant-voltage power supply circuit unit and includes a thermosensitive element that is fed from the constant-voltage power supply circuit unit and generates a temperature detection voltage Tp corresponding to the temperature near the constant-voltage power supply circuit unit.

The output voltage correction data decides the combined resistance of the resistance circuit network 136a so as to reduce the difference between the output voltage of the constant-voltage power supply circuit unit and a target voltage due to characteristic variation of components applied.

The temperature calibration information reading and storing unit 402a writes and saves a digitally converted value of the detection voltage of the temperature detector 139b at least at the time of transfer of the output voltage correction data, as calibration reference temperature data T1 into the first data memory 122a.

The output voltage estimating unit 603 estimates the current output voltage of the constant-voltage power supply circuit unit by comparing the current detection output of the temperature detector 139b with the calibration reference temperature data stored in the first data memory 122a.

The error correcting unit is the AD conversion value correcting unit 606 (see FIG. 6) that corrects the AD conversion value on the basis of the estimated output voltage and thus corrects an error of AD conversion output data.

The program memory 120a or the first data memory 122a contains the voltage variation rate data. The voltage variation rate data is data of average voltage variation rate that is statistically calculated by actually measuring, in advance, the variation characteristics of output voltage in the case where the ambient temperature is changed with respect to many products. The voltage variation rate data is stored from the external tool 107a to the program memory 120a or the first data memory 122a. The output voltage estimating unit 603 estimates the current output voltage on the basis of the current output of the temperature detector 139b and the voltage variation rate data.

Therefore, there is an advantage that the current output voltage can be estimated on the basis of the measured ambient temperature even if a highly accurate voltage detecting unit is not provided as the constant-voltage power supply circuit unit.

The program memory 120a or the first data memory 122a contains the conversion processing data. The program memory 120a also contains the program that provides the AD conversion value correcting unit 606, which is one of the error correcting units.

The conversion processing data is average variation characteristic data that is statistically calculated by actually measuring, in advance, the variation characteristics of power supply voltage versus detected output voltage for a part or all of the analog signals inputted to the multi-channel AD converter 124, with respect to many analog sensors. The variation characteristic data is stored from the external tool 107a to the program memory 120a or the first data memory 122a.

The AD conversion value correcting unit 606 is a detected value correcting unit that corrects the value of at least a part of the digitally converted voltages of the multi-channel AD converter 124 on the basis of the current output voltage of the constant-voltage power supply circuit unit estimated by the output voltage estimating unit 603 and the conversion processing data.

Therefore, there is an advantage that an accurate detection value can be acquired by correcting the AD conversion output, even if the output voltage of the constant-voltage power supply circuit unit varies because of the temperature change and the AD conversion value of the analog sensor output changes.

The program memory 120a further contains the programs that provide the externally measured voltage reading and storing unit 403a, the calibration confirming unit 404b, and the correction data calculating and transfer units 405a and 405b.

The externally measured voltage reading and storing unit 403a causes the highly accurate voltmeter 200 provided outside of the vehicle-borne electronic control device 100a to measure the output voltage of the constant-voltage power supply circuit unit, and transfers and temporarily stores the measured voltage into the RAM memory 121 in the vehicle-borne electronic control device 100a via the external tool 107a.

The calibration confirming unit 404b reads out the externally measured voltage V10 measured by the highly accurate voltmeter 200 and confirms whether the difference between the externally measured voltage V10 and the target value of the output voltage is corrected to fall within an allowable error range.

When the result of the judgment by the calibration confirming unit 404b shows that the difference is too large, the correction data calculating and transfer units 405a and 405b are executed. These units calculate the correction data Daj in response to the differential voltage ΔV between the externally measured voltage V10 and the target value of the output voltage, and transfer and rewrite the output voltage correction data into the second data memory 134a.

The externally measured voltage reading and storing unit 403a, the calibration confirming unit 404b, and the correction data calculating and transfer unit 405a and 405b constitute the calibration control unit executed in the adjustment operation of the vehicle-borne electronic control device 10a.

Therefore, even if there are difference and variation of individual circuit components, the output voltage of the constant-voltage power supply circuit unit is corrected by the output voltage correction data. Since this correction data is calculated within the vehicle-borne electronic control device 100a, there are advantages that the tool for adjustment for shipment is simplified and that a standardized external tool can be used for the vehicle-borne electronic control devices 100a of various specifications.

Since the calibration control is not executed during the actual vehicle operation of the microprocessor 110a, there is an advantage that the control burden on the microprocessor 110a does not increase.

The highly accurate voltmeter 200, which is the test inspection facility, is a voltmeter having accuracy equivalent to or higher than the minimum unit of the output voltage that can be regulated by the second data memory 134a. The measured voltage measured by the highly accurate voltmeter 200 is read out and temporarily stored as digital data into the RAM memory 121 by the externally measured voltage reading and storing unit 403a via the external tool 107a.

Therefore, there is an advantage that highly accurate output voltage correction data Daj can be calculated on the basis of digital data having sufficiently high resolution.

The calibration confirming unit 404b further includes the re-transfer unit 406b, at least one control unit of either the correction value limiting unit 406a or the number-of-times-of-correction limiting unit 406b, and the anomaly notifying unit 406c.

The re-transfer unit 406b acts when the target difference confirmed by the calibration confirming unit 404b is too large. It calculates correction data Daj again in accordance with the differential voltage ΔV between the externally measured voltage V10 updated, read out and the temporarily stored by the externally measured voltage reading and storing unit 403a and the target value of the output voltage, and rewrites and transfers the new output voltage correction data Daj to the second data memory 134a.

The correction value limiting unit 406a stops the calibration operation when the correction value calculated by the correction data calculating unit 405a exceeds a predetermined allowable value.

The number-of-times-of-correction limiting unit 406b stops the calibration operation when the difference between the externally measured voltage V10 and the target value of the output voltage is not corrected to fall within the allowable error range even if the number of times of correction processing, update and transfer by the re-transfer unit 406b exceeds a predetermined number of times.

The anomaly notifying unit 406c acts when the correction value limiting unit 406a or the number-of-times-of-correction limiting unit 406b has stopped the calibration operation. It gives a warning and display of a calibration-disabled state to the external tool 107a.

Therefore, there is an advantage that a product that cannot be adjusted to a normal output voltage can be detected and eliminated at the stage of adjustment for shipment.

The correction data calculating unit 405a transfers first and second output voltage correction data Daj1 and Daj2 to the second data memory as a tentative value, calculates differential voltages $\Delta V1=V01-Vcc$ and $\Delta V2=V02-Vcc$ between externally measured voltages V01 and V02 read out and stored by the externally measured voltage reading and storing units and the target value Vcc of the output voltage corresponding to the correction data Daj1 and Daj2, and calculates output voltage correction data Daj for a differential voltage of 0 by interpolation calculation based on the differential voltages ΔV1 and ΔV2 corresponding to the correction data Daj1 and Daj2 The correction data calculating unit 405a calculates the differential voltages ΔV1 and ΔV2 between the externally measured voltages V01 and V02 read out and stored by the externally measured voltage reading and storing units 502a and 502b and the target value of the output voltage when the first and second output voltage correction data Daj1 and Daj2 are transferred to the second data memory 134a.

Therefore, there is an advantage that the accurate output voltage correction data Daj can be calculated easily by the simple calculating unit.

Embodiment 2 of the Invention (1) Detailed Description of Structure of Embodiment 2

Hereinafter, calibration control in a device according to a second embodiment of this invention will be described with reference to the block diagrams of FIGS. 7 and 7A.

Figure 7:
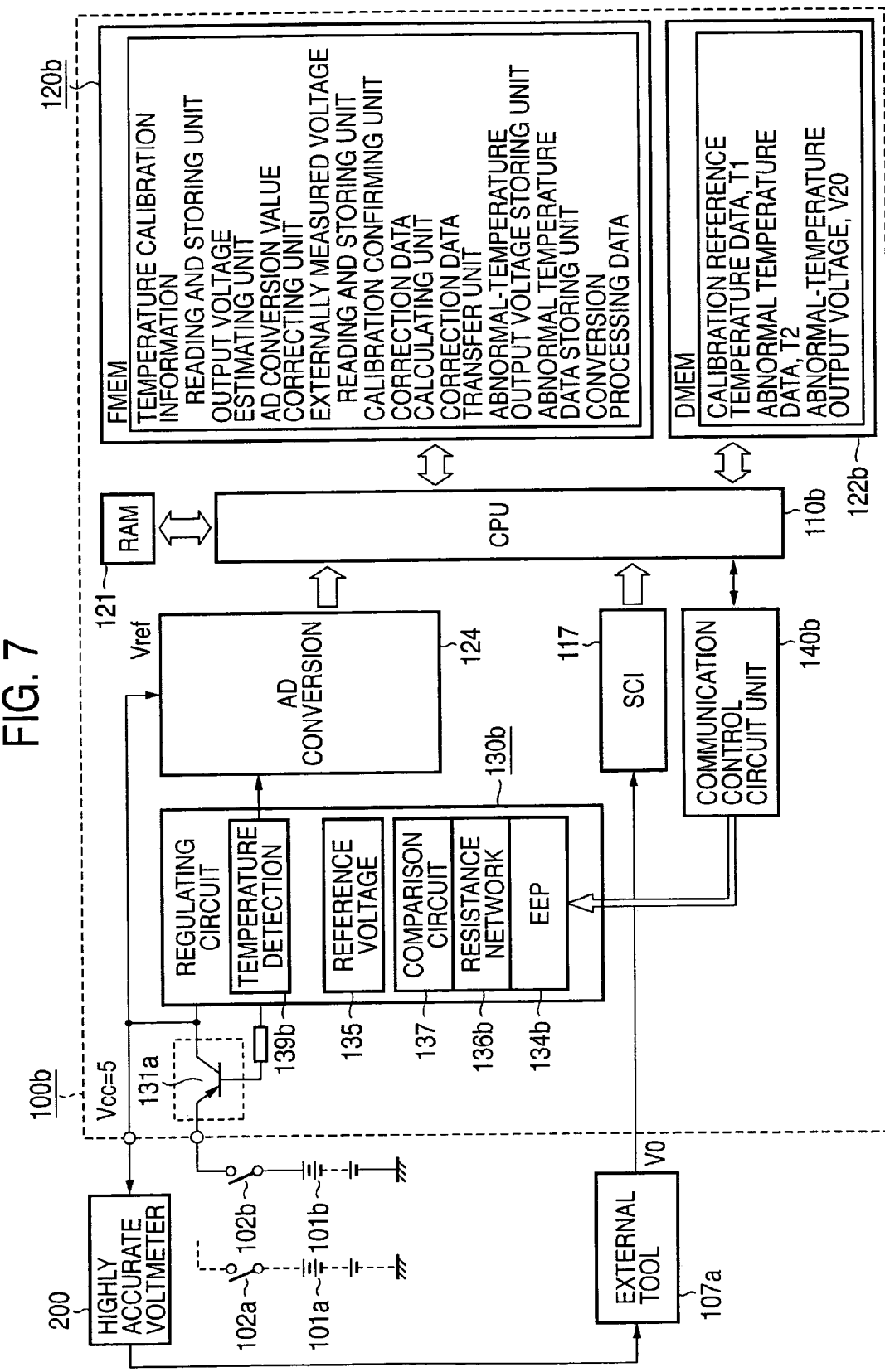
FIG. 7 is a block diagram showing calibration control in a device according to a second embodiment of this invention.
Figure 7A:
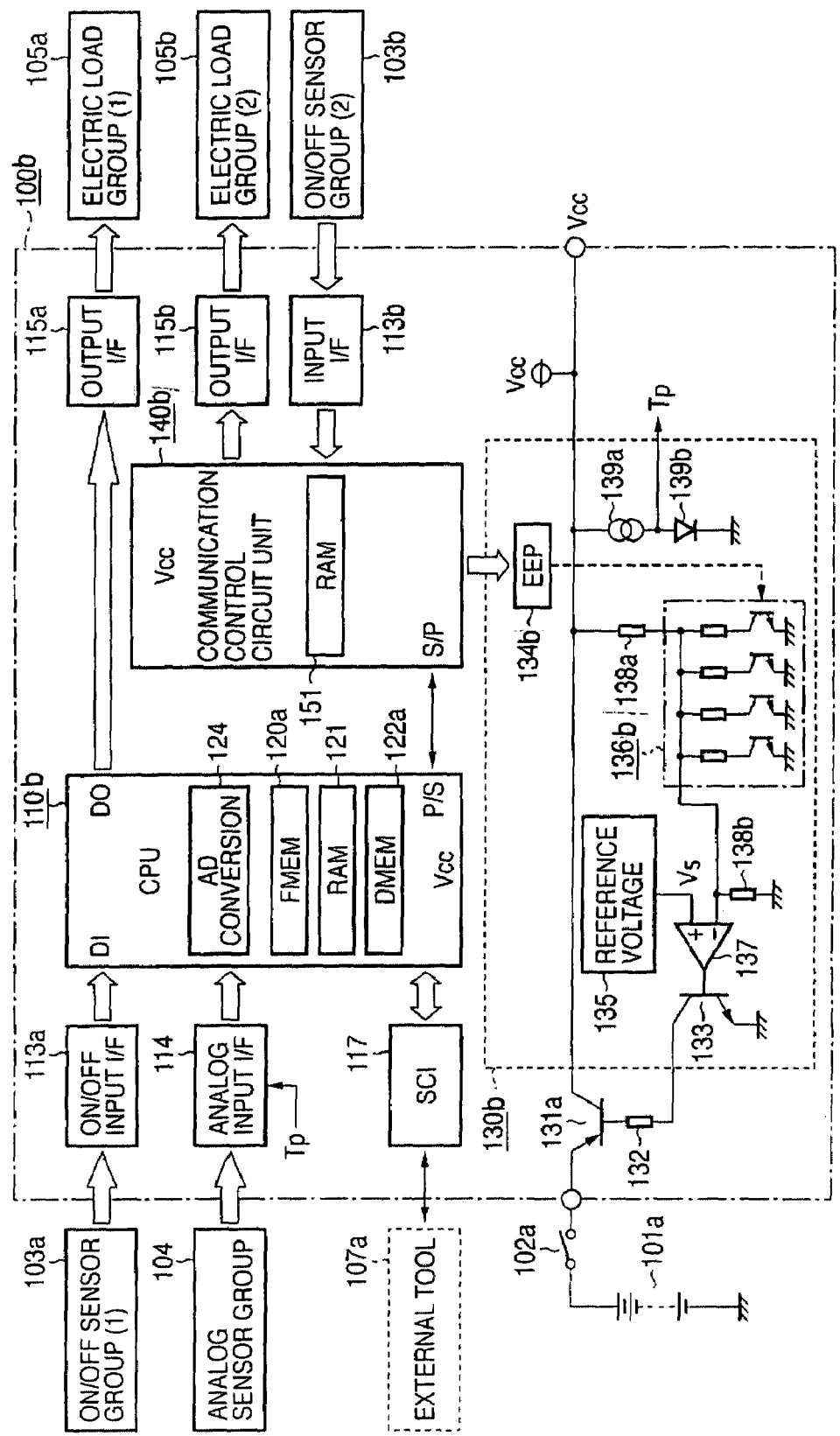
FIG. 7A is a block diagram essentially similar to FIG. 1, but labeled to reflect the elements of the second embodiment.

A vehicle-borne electronic control device 100b shown in FIGS. 7 and 7A has a temperature calibration unit that is different from the temperature calibration unit of the device shown in FIG. 1. At the stage of actual vehicle operation, external connection as in the device of FIG. 1 is made.

In FIGS. 7 and 7A, an external power supply 101b, which is equivalent to a vehicle-borne battery 101a, is a facility to feed the vehicle-borne electronic control device 101b when performing an adjustment operation via a power switch 102b, which is equivalent to a power switch 102a.

A highly accurate voltmeter 200, which is a facility for the adjustment operation, measures the output voltage of a power transistor 131a in the vehicle-borne electronic control device 100b and sends the digital value of the measured voltage to a RAM memory 121 via an external tool 107a, a serial interface 117 and a microprocessor 10b.

As a reference voltage Vref of a multi-channel AD converter 124 cooperating with the microprocessor 110b, a constant-voltage output Vcc of a constant-voltage power supply circuit unit is used as it is.

A program memory 120b cooperating with the microprocessor 110b contains a program that provides a calibration control unit, which will be described later with reference to FIG. 9, and a program and reference constant data that provide an error correcting unit, which will be described later with reference to FIG. 10.

In a first data memory 122b cooperating with the microprocessor 10b, calibration reference temperature data T1 is stored, which represents the digitally converted value of the output voltage of a temperature detector 139b at the time of calibration of the output voltage of the constant-voltage power supply circuit unit, and also abnormal temperature data T2 and abnormal-temperature output voltage data V20 in the case where the ambient temperature is changed are stored.

To a second data memory 134b provided in an output voltage regulating circuit unit 130b, output voltage correction data Daj is transferred from the microprocessor 10b via a communication control circuit unit 140b so as to regulate the combined resistance of a resistance circuit network 136b. This output voltage correction data Daj is calculated by the microprocessor 110b in the above-described manner shown in FIG. 5.

Figure 8B:
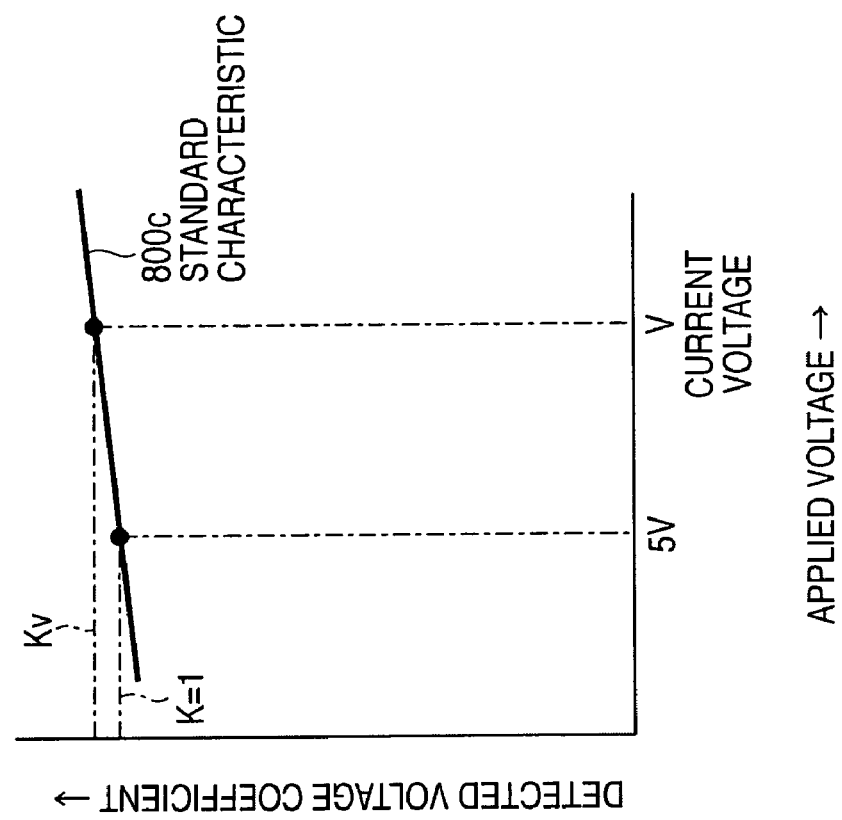
FIGS. 8A and 8B are graphs for explaining the calibration control shown in FIG. 7.
Figure 8A:
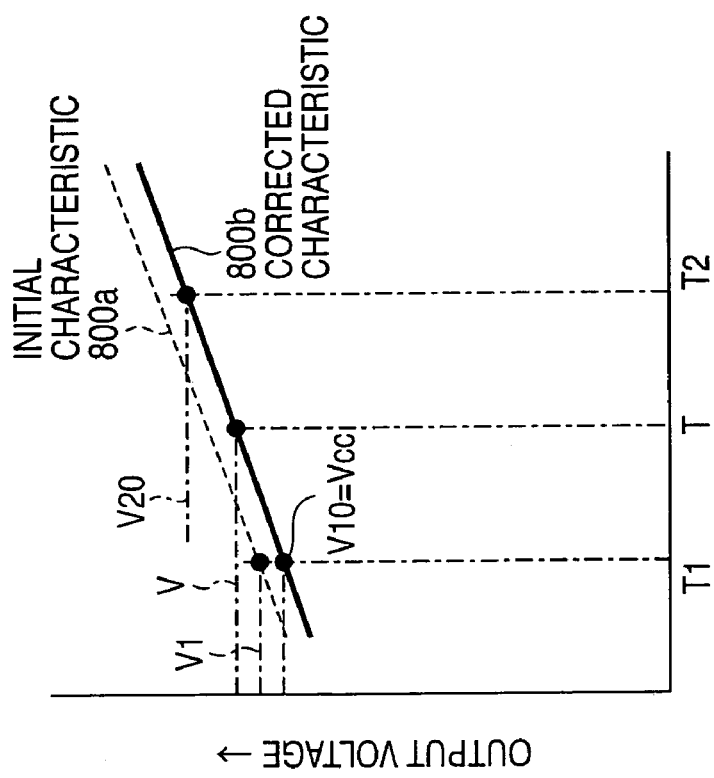

In FIG. 8A showing variation characteristics of the output voltage of the constant-voltage power supply circuit unit, the horizontal axis represents the temperature near the constant-voltage power supply circuit unit. Calibration temperature T1 is the temperature near the constant-voltage power supply circuit unit detected by the temperature detector 139b when the vehicle-borne electronic control device 100b is in a normal-temperature environment. Calibration temperature T2 is the temperature near the constant-voltage power supply circuit unit detected by the temperature detector 139b when the vehicle-borne electronic control device 100b is in a predetermined high-temperature or low-temperature environment. Measured temperature T is the temperature near the constant-voltage power supply circuit unit detected by the temperature detector 139b when the vehicle-borne electronic control device 100b is at the current ambient temperature.

The vertical axis represents the output voltage of the constant-voltage power supply circuit unit, and its target value, that is, the constant-voltage output Vcc is, for example, DC 5 V.

A straight line 800a represents the initial characteristic of the output voltage before initial adjustment. The value of the externally measured voltage measured by the highly accurate voltmeter 200 at the calibration temperature T1 is indicated by V1.

A straight line 800b represents the corrected characteristic of the output voltage after initial adjustment. The output voltage correction data is written to the second data memory 134b so that the value of the externally measured voltage measured by the highly accurate voltmeter 200 at the calibration temperature T1 becomes V10=Vcc (=5 V).

An output voltage V20 is the actual output voltage when the temperature near the constant-voltage power supply circuit unit adjusted so that the output voltage becomes Vcc at the calibration temperature T1 has become the calibration temperature T2. The value of this output voltage V20 and the value of the calibration temperature T2 are stored in the program memory 120b or the first data memory 122b as abnormal-temperature output voltage or abnormal-temperature environment temperature data.

The calibration temperature T2 may be a temperature different from the calibration temperature T1, and the output voltage may be found in a predetermined low-temperature environment, and preferably in both low- and high-temperature environments. An estimated output voltage V is acquired by calculating the output voltage at the current measured temperature T by interpolation from the relation of V10 (=Vcc) versus T1 and V20 versus T2.

FIG. 8B, showing variation characteristics of applied voltage versus detected voltage of the analog sensor, shows the same characteristics as in FIG. 3B. In FIG. 8B, the horizontal axis represents the output voltage of the constant-voltage power supply circuit unit as a power supply voltage fed and applied to the analog sensor, and the vertical axis represents the variation coefficient of the detected voltage of the analog sensor.

(2) Detailed Description of Effects and Operations of Embodiment 2

Next, operations in the calibration control block constructed as shown in Figs. 7 and 7A will be described with reference to the flowchart of FIG. 9.

Prior to the adjustment operation, various programs are transferred from the external tool 107a to the program memory 120b in accordance with a boot program, not shown, cooperating with the microprocessor 110b. The programs transferred here include a communication control program, an input/output control program, basic information such as control constant data, as well as programs and reference data to provide a calibration control unit and an error correcting unit.

In FIG. 9, at step 900, as the power switch 102b is closed and the external tool 107a is connected so that an adjustment operation mode is selected, the microprocessor 110b starts the adjustment operation. At the next step 901a, it is judged whether a normal-temperature adjustment completion flag is set at step 908a, which will be described later. If the flag is already set, the processing shifts to step 901b. If the flag is not set, the processing shifts to step 902a.

At step 902a, the digitally converted value of the temperature detection voltage Tp detected by the temperature detector 139b is read out and stored into the first data memory 122b as calibration reference temperature data T1.

At the next step 903a, the measured voltage of the highly accurate voltmeter 200 is read out and temporarily stored into the RAM memory 121 via the external tool 107a. At the next step 904a, it is judged whether the differential voltage ΔV=V1−5 between the externally measured voltage V1 read out and temporarily stored at step 903a and the true target value of the constant-voltage output Vcc, for example, DC 5 V, is a normal value within a predetermined threshold range. If it is a normal value, the processing shifts to step 907a. If it is not a normal value, the processing shifts to step block 905a.

At step block 905a, output voltage correction data (hereinafter simply referred to as correction data Daj or correction value Daj) is calculated in accordance with the differential voltage ΔV=V1−5, as described above with reference to FIG. 5.

If, for example, six regulating resistors are provided in the resistance circuit network 136b and a 6-bit correction value Daj is to be written to the second data memory 134b,the correction value Daj is within a range of 0 to 63. As a design theoretical value, a correction value Daj =30 is selected when the differential voltage ΔV =V1-5is 0 V. If the differential voltage ΔV =V1-5 increases, the correction value Daj is decreased to increase the combined resistance of the resistance circuit network 136b. If the differential voltage ΔV = V1-5 decreases, the correction value Daj is increased to decrease the combined resistance of the resistance circuit network 136b.Thus, the negative feedback voltage applied to the inverted input terminal of the comparison amplifying circuit 137 is increased or decreased.

At step 906a following step block 905a, it is judged whether the correction value Daj calculated at step 905a is out of an appropriate range of, for example, 2 to 61. If it is out of the range, the processing shifts to step 906c. If it is not out of the range, the processing shifts to step 905b. The circuit constant is so designed that the correction value Daj does not fall out of the range of 2 to 61 unless a product anomaly occurs.

At step 905b, the correction value Daj calculated at step block 905a is transferred to the second data memory 134b. At the next step 904b, it is judged whether the differential voltage between the externally measured voltage V10 based on the correction value Daj transferred at step 905b and the true target value of the constant-voltage output Vcc, for example, DC 5 V, is a normal value within a predetermined threshold range. If it is a normal value, the processing shifts to step 907a. If it is not a normal value, the processing shifts to step 906b.

At step 906b, it is judged whether the number of times of correction at step block 905a has exceeded a predetermined number of times. If it has not exceeded the predetermined number of times, the processing returns to step block 905a. If it has exceeded the predetermined number of times, the processing shifts to step 906c. At step 906c, an anomaly warning display command is issued to the external tool 107a and then the processing shifts to operation end step 909.

Step 907a is executed when the result of the judgment at step 904a or 904b is YES and the differential voltage between the externally measured voltage and the true target value of the constant-voltage output Vcc, for example, DC 5 V, is a normal value within a predetermined threshold range. At step 907a, the value of the externally measure voltage V10 is read out and stored. Practically, V10 is approximately equal to Vcc. Therefore, it is not particularly necessary to read out and store the value, as a matter of convenience.

At the subsequent step 908a, a normal-temperature adjustment completion flag is set and it is stored that the calibration completion state has been set. At the subsequent operation end step 909, execution standby for the other control programs of the microprocessor 10b is performed. After that, operation start step 900 is activated again and the subsequent steps are repeated.

At step 901b, it is judged whether a high-temperature adjustment completion flag is set at step 908b, which will be described later. If the flag is already set, the processing shifts to operation end step 909. If the flag is not set, the processing shifts to step 902b.

At step 902b, the digitally converted value of the temperature detection voltage Tp detected by the temperature detector 193b when the vehicle-borne electronic control device 100b is put in a high-temperature or low-temperature environment is read out and stored into the first data memory 122b as calibration reference temperature data T2.

At the subsequent step 907b, the value of the externally measured voltage V20 is read out and stored into the first data memory 122b as a high-temperature output voltage.

At the subsequent step 908b, a high-temperature adjustment completion flag is set and it is stored that the calibration completion state is set. Then, the processing shifts to operation end step 909.

To summarize the operation flow of the adjustment operation described above, step 902a provides a temperature calibration information reading and storing unit that reads out and stores the calibration reference temperature. Step 902b provides an abnormal-temperature environment temperature data storing unit. Step 903a provides an externally measured voltage reading and storing unit. Step 904b provides a calibration confirming unit. Step block 905a provides a correction data calculating unit. Step 905b provides a correction data transfer unit. Step 906a provides a correction value limiting unit. Step 906b provides a re-transfer unit (number-of-times-of-correction limiting unit). Step 906c provides an anomaly notifying unit. Step 907a provides a normal-temperature output voltage storing unit. Step 907b provides an abnormal-temperature output voltage storing unit.

It is also possible to delete the calibration control program shown in FIGS. 9 and 5, execute the calibration control by the external tool 107a. The microprocessor 110b may simply write and save the reference control constants, the calibration reference temperature data and the output voltage correction data sent from the external tool 107a, into the first data memory 122b and the second data memory 134b. The microprocessor 110b may simply execute the error correction control unit of FIG. 10, which is the operation during the actual operation of the vehicle-borne electronic control device 100b.

Now, the operation of the error correcting unit in the case where the vehicle-borne electronic control device 100b constructed as shown in FIGS. 7 and 7A is carried on an actual vehicle will be described with reference to the flowchart of FIG. 10.

Prior to the driving operation, various programs are transferred from the external tool 107a to the program memory 120b. After the adjustment operation shown in FIG. 9 is carried out, the external tool 107a is disconnected, or the adjustment operation mode is canceled to shift to the monitor mode by operating the keyboard in the external tool 107a.

Figure 10:
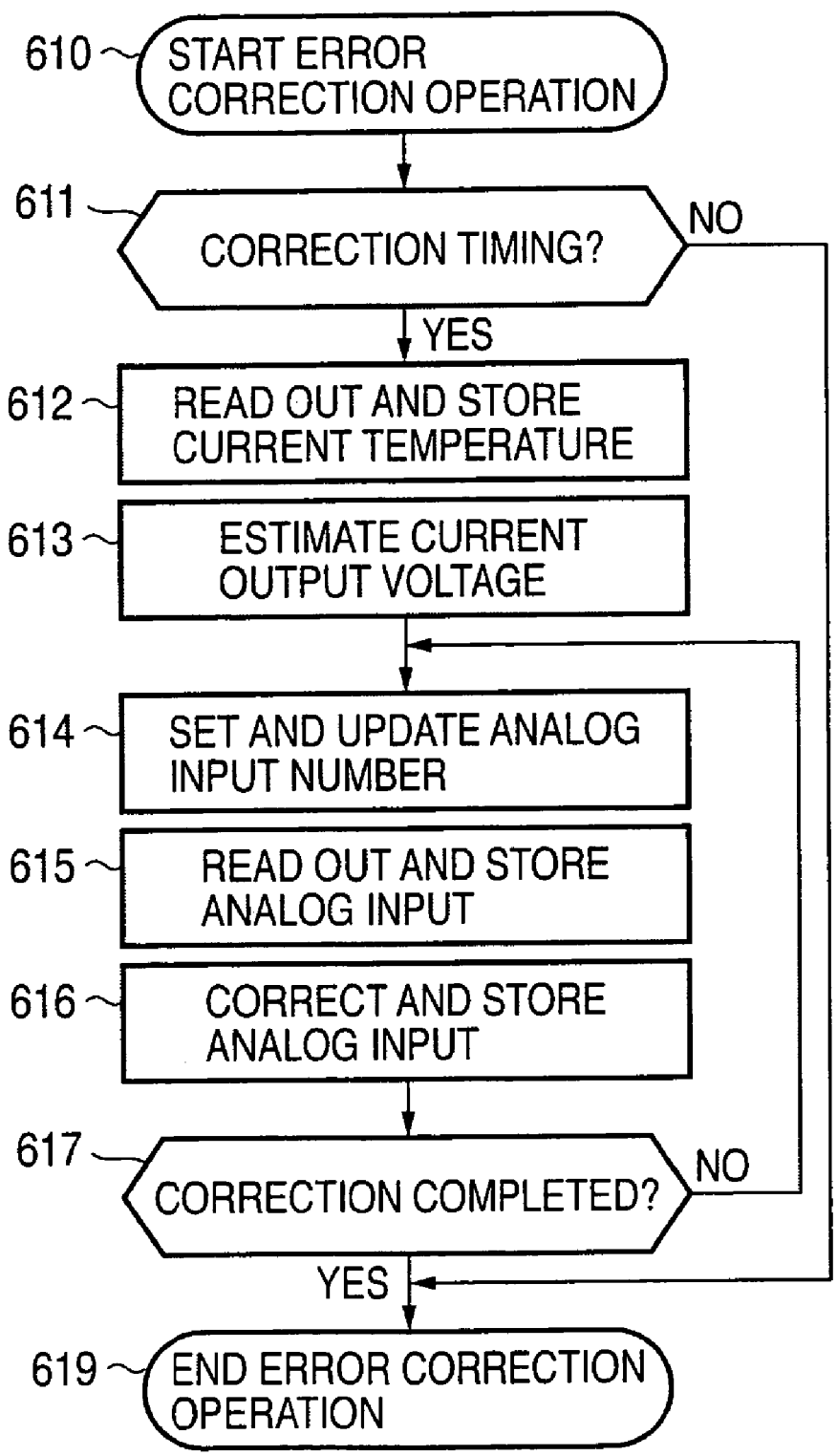
FIG. 10 is a flowchart for explaining a correction operation during the actual operation of the device shown in FIG. 7.

In FIG. 10, at step 610, as the power switch 102a is closed, the microprocessor 110b starts the error correction operation. At the next step 611, it is judged whether it is the error correction timing now or not. If it is not the error correction timing, the processing shifts to operation end step 619. If it is the error correction timing, the processing shifts to step 612.

The result of the judgment of the error correction timing at step 611 is YES, for example, at the time of initial operation immediately after the power switch 102a is closed. After the power switch 102a is closed, the result of judgment becomes YES every predetermined cycle.

At step 612, the current measured temperature T measured by the temperature detector 139b is read out and stored into the RAM memory 121. At the next step 613, the current output voltage indicated by the straight line 800b in FIG. 8A is calculated and stored as an estimated output voltage V to the RAM memory 121.

At the subsequent step 614, the number of the analog sensor that requires correction processing as indicated by the straight line 800c in FIG. 8B is set. At the next step 615, the digital value acquired by converting the input voltage of the analog sensor of that number by the multi-channel AD converter 124 is read out and stored into the RAM memory 121. At the next step 616, the conversion processing related to the analog sensor of that number, stored in advance in the program memory 120b or the first data memory 122b, is read out, and the digitally converted value read out and stored at step 615 is corrected and stored as an error correction digital value to the RAM memory 121. At the subsequent step 617, it is judged whether the error correction processing is completed with respect to all the analog sensors that require correction processing. If it is not completed, the processing shifts to step 614 and the sensor number is updated. If it is completed, the processing shifts to operation end step 619.

At operation end step 619, the microprocessor 110b executes the other control operations. As a predetermined time passes, operation start step 610 is activated and the subsequent steps are repeated.

In the above-described flow of error correction operation, step 613 provides the output voltage estimating unit described with reference to FIG. 8A, and step 616 provides the AD conversion value correcting unit described with reference to FIG. 8B.

(3) Description of Construction and Features of Embodiment 2

As is clear from the above description, the vehicle-borne electronic control device 100b according to Embodiment 2 of this invention includes the microprocessor 110b that has the non-volatile program memory 120b and the first data memory 122b storing the control programs and control constants transferred and written via the external tool 107a and that also has the RAM memory 121 for arithmetic processing. The vehicle-borne electronic control device 100b also has the constant-voltage power supply circuit unit, the output voltage regulating circuit unit 130b cooperating with the non-volatile second data memory 134b, the multi-channel AD converter 124, and the temperature detector 139b. The program memory 120b contains the programs that provide the temperature calibration information reading and storing unit 902a, the output voltage estimating unit 613 and the error correcting unit. The second data memory 134b contains the output voltage correction data.

The constant-voltage power supply circuit unit is feed-controlled from the vehicle-borne battery 101a via the power transistor 131a, generates a predetermined constant-voltage output Vcc, and feeds at least the microprocessor 110b, the multi-channel AD converter 124, and the analog sensor group connected to the multi-channel AD converter 124.

The output voltage regulating circuit unit 130b includes the reference voltage generating circuit 135 that generates a reference voltage Vs, the comparison amplifying circuit 137 that compares the magnitude of a voltage proportional to the output voltage of the constant-voltage power supply circuit unit with the magnitude of the reference voltage Vs, the resistance circuit network 136b that is added to at least one input of the comparison amplifying circuit 137 and fine-tunes the comparison input voltage, and the plural open/close elements that are selectively continued in accordance with the contents stored in the second data memory 134b and change the combined resistance value of the resistance circuit network 136b. The continuity of the power transistor 131a is controlled by the output of the comparison amplifying circuit 137. The output voltage is negative-feedback-controlled so that a predetermined constant-voltage output Vcc proportional to the reference voltage Vs is acquired.

The detected voltage from the analog sensor group is inputted to the multi-channel AD converter 124. When the analog input voltage of the AD converter becomes equal to the reference voltage Vref supplied from the constant-voltage power supply circuit unit, the multi-channel AD converter 124 generates a maximum digital output of predetermined resolution and selectively inputs digitally converted values of many analog inputs to the microprocessor 110b.

The temperature detector 139b is installed near the constant-voltage power supply circuit unit and includes a thermosensitive element that is fed from the constant-voltage power supply circuit unit and generates a temperature detection voltage Tp corresponding to the temperature near the constant-voltage power supply circuit unit.

The output voltage correction data decides the combined resistance of the resistance circuit network 136b so as to reduce the difference between the output voltage of the constant-voltage power supply circuit unit and a target voltage due to characteristic variation of components applied.

The temperature calibration information reading and storing unit 902a writes and saves a digitally converted value of the detection voltage of the temperature detector 139b at least at the time of transfer of the output voltage correction data, as calibration reference temperature data T1 into the first data memory 122b.

The output voltage estimating unit 613 estimates the current output voltage of the constant-voltage power supply circuit unit by comparing the current detection output of the temperature detector 139b with the calibration reference temperature data T1 stored in the first data memory 122b.

The error correcting unit is the AD conversion value correcting unit 616 that corrects the AD conversion value on the basis of the estimated output voltage and thus corrects an error of AD conversion output data.

The program memory 120b further contains the programs that provide the abnormal-temperature output voltage storing unit 907b and the abnormal-temperature environment temperature data storing unit 902b for an abnormal-temperature environment of a higher or lower temperature than the calibration reference temperature.

The abnormal-temperature output voltage storing unit 907b writes and saves the value of the externally measured voltage V20 in the abnormal-temperature environment to the first data memory 122b as an abnormal-temperature output voltage.

The abnormal-temperature environment temperature data storing unit 902b writes and saves the digitally converted value of the detected voltage of the temperature detector 139b at the time when the abnormal-temperature output voltage V20 is measured, to the first data memory 122b, as an abnormal-temperature environment temperature T2.

The output voltage estimating unit 613 calculates the output voltage at the current detected temperature from the correlation between the target output voltage of the constant-voltage power supply circuit unit or the externally measured voltage V10 at the calibration reference temperature T1 and the externally measured voltage V20 at the abnormal-temperature environment temperature T2.

The variation characteristics are measured and stored with respect to the actual product even if the variation characteristic of the output voltage due to the temperature change differs among individual products. Therefore, there is an advantage that the output voltage at the current temperature can be accurately estimated by interpolation.

Moreover, there is an advantage that the difference and variation among individual temperature detectors 139b do not affect the estimation of the output voltage.

The program memory 120b or the first data memory 122b contains the conversion processing data. The program memory 120b also contains the program that provides the AD conversion value correcting unit 616, which is one of the error correcting units.

The conversion processing data is average variation characteristic data that is statistically calculated by actually measuring, in advance, the variation characteristics of power supply voltage versus detected output voltage for a part or all of the analog signals inputted to the multi-channel AD converter 124, with respect to many analog sensors. The variation characteristic data is stored from the external tool 107a to the program memory 120b or the first data memory 122b.

The AD conversion value correcting unit 616 is a detected value correcting unit that corrects the value of at least a part of the digitally converted voltages of the multi-channel AD converter 124 on the basis of the current output voltage of the constant-voltage power supply circuit unit estimated by the output voltage estimating unit 613 and the conversion processing data.

Therefore, there is an advantage that an accurate detection value can be acquired by correcting the AD conversion output, even if the output voltage of the constant-voltage power supply circuit unit varies because of the temperature change and the AD conversion value of the analog sensor output changes.

The program memory 120b further contains the programs that provide the externally measured voltage reading and storing unit 903a, the calibration confirming unit 904b, and the correction data calculating and transfer units 905a and 905b.

The externally measured voltage reading and storing unit 903a causes the highly accurate voltmeter 200 provided outside of the vehicle-borne electronic control device 100b to measure the output voltage of the constant-voltage power supply circuit unit, and transfers and temporarily stores the measured voltage into the RAM memory 121 in the vehicle-borne electronic control device 100b via the external tool 107a.

The calibration confirming unit 904b reads out the externally measured voltage V10 measured by the highly accurate voltmeter 200 and confirms whether the difference between the externally measured voltage V10 and the target value of the output voltage is corrected to fall within an allowable error range.

When the result of the judgment by the calibration confirming unit 904b shows that the difference is too large, the correction data calculating and transfer units 905a and 905b are executed. These units calculate the correction data Daj in response to the differential voltage ΔV between the externally measured voltage V10 and the target value of the output voltage, and transfer and rewrite the output voltage correction data into the second data memory 134b.

The externally measured voltage reading and storing unit 903a, the calibration confirming unit 904b, and the correction data calculating and transfer unit 905a and 905b constitute the calibration control unit executed in the adjustment operation of the vehicle-borne electronic control device 100b.

Therefore, even if there are difference and variation of individual circuit components, the output voltage of the constant-voltage power supply circuit unit is corrected by the output voltage correction data. Since this correction data is calculated within the vehicle-borne electronic control device 100b, there are advantages that the tool for adjustment for shipment is simplified and that a standardized external tool can be used for the vehicle-borne electronic control devices 100b of various specifications.

Since the calibration control is not executed during the actual vehicle operation of the microprocessor 110b, there is an advantage that the control burden on the microprocessor 110b does not increase.

The highly accurate voltmeter 200, which is the test inspection facility, is a voltmeter having accuracy equivalent to or higher than the minimum unit of the output voltage that can be regulated by the second data memory 134b. The measured voltage measured by the highly accurate voltmeter 200 is read out and temporarily stored as digital data into the RAM memory 121 by the externally measured voltage reading and storing unit 903a via the external tool 107a.

Therefore, there is an advantage that highly accurate output voltage correction data Daj can be calculated on the basis of digital data having sufficiently high resolution.

The calibration confirming unit 904b further includes the re-transfer unit 906b, at least one control unit of either the correction value limiting unit 906a or the number-of-times-of-correction limiting unit 906b, and the anomaly notifying unit 906c.

The re-transfer unit 906b acts when the target difference confirmed by the calibration confirming unit 904b is too large. It calculates correction data Daj again in accordance with the differential voltage ΔV between the externally measured voltage V10 updated, read out and the temporarily stored by the externally measured voltage reading and storing unit 903a and the target value of the output voltage, and rewrites and transfers the new output voltage correction data Daj to the second data memory 134b.

The correction value limiting unit 906a stops the calibration operation when the correction value calculated by the correction data calculating unit 905a exceeds a predetermined allowable value.

The number-of-times-of-correction limiting unit 906b stops the calibration operation when the difference between the externally measured voltage V10 and the target value of the output voltage is not corrected to fall within the allowable error range even if the number of times of correction processing, update and transfer by the re-transfer unit 906b exceeds a predetermined number of times.

The anomaly notifying unit 906c acts when the correction value limiting unit 906a or the number-of-times-of-correction limiting unit 906b has stopped the calibration operation. It gives a warning and display of a calibration-disabled state to the external tool 107a.

Therefore, there is an advantage that a product that cannot be adjusted to a normal output voltage can be detected and eliminated at the stage of adjustment for shipment.

The correction data calculating unit 905a transfers first and second output voltage correction data Daj1 and Daj2 to the second data memory 134b as a tentative value, calculates differential voltages $\Delta V1 = V01 - Vcc$ and $\Delta V2 = V02 - Vcc$ between externally measured voltages V01 and V02 read out and stored by the externally measured voltage reading and storing units 502a and 502b and the target value Vcc of the output voltage corresponding to the correction data Daj1 and Daj2, and calculates output voltage correction data Daj for a differential voltage of 0 by interpolation calculation based on the differential voltages ΔV1 and ΔV2 corresponding to the correction data Daj1 and Daj2.

Therefore, there is an advantage that the accurate output voltage correction data Daj can be calculated easily by the simple calculating unit.

Embodiment 3 of the Invention (1) Detailed Description of Structure of Embodiment 3

Hereinafter, the overall structure of a device according to a third embodiment of this invention will be described with reference to the block diagram of FIG. 11, mainly with respect to the differences from the device shown in FIG. 1.

Figure 11:
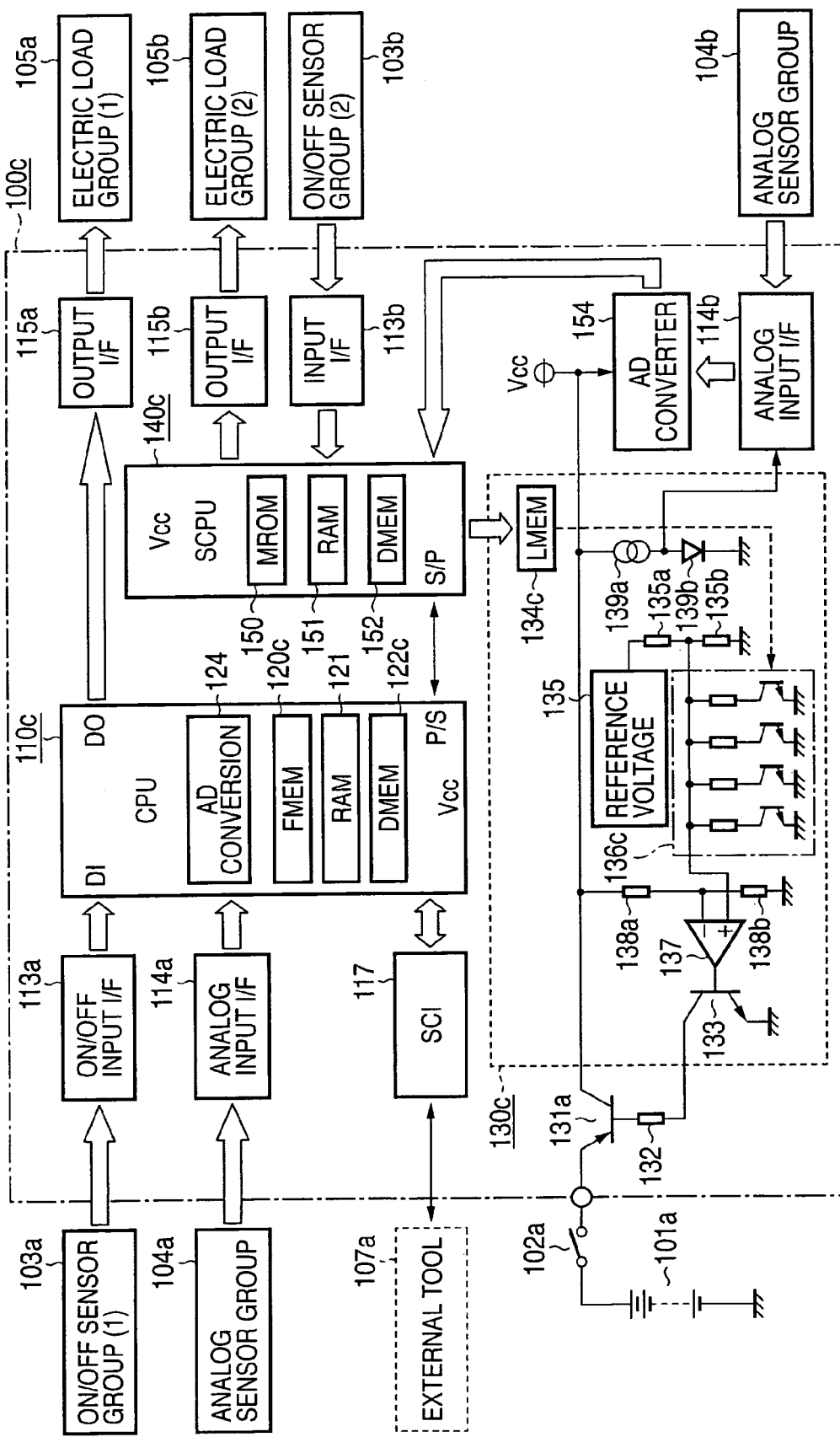
FIG. 11 is a block diagram showing an overall structure of a device according to a third embodiment of this invention.

In FIG. 11, a vehicle-borne electronic control device 100c is fed from a vehicle-borne battery 101a via a power switch 102a and controls electric load groups 105a and 105b in accordance with the ON/OFF state of open/close sensor groups 103a and 103b and the signal level of analog sensor groups 104a and 104b. An external tool 107a is a setting and display device that is connected to the vehicle-borne electronic control device 100c when conducting shipment inspection on the production line of the vehicle-borne electronic control device 100c, shipment inspection on the production line of an automobile, or maintenance and inspection at a service shop.

A microprocessor 110c cooperates with a non-volatile program memory 120c, a RAM memory 121 for arithmetic processing, a non-volatile first data memory 122c, and a multi-channel AD converter 124, and forms the main unit for control operation of the vehicle-borne electronic control device 100c.

An output voltage regulating circuit unit 130c has a resistance circuit network 136c. This resistance circuit network 136c is connected parallel to a voltage-dividing resistor 135b, of voltage-dividing resistors 135a and 135b that divide the output voltage of a reference voltage generating circuit 135. The divided voltage is applied to a non-inverted input of a comparison amplifying circuit 137. A voltage proportional to the output voltage of a power transistor 131a is applied to an inverted input of the comparison amplifying circuit 137 that controls the continuity of the power transistor 131a via a transistor 133 and a base resistor 132, and its proportional coefficient is decided by the voltage-dividing resistors 138a and 138b.

The resistance circuit network 136c has plural regulating resistors having resistance values, each being twice the value of the previous one, and open/close elements connected in series with the regulating resistors. The open/close elements are selectively continued in accordance with output voltage correction data (hereinafter simply referred to as correction data Daj or correction value Daj) stored in a mediate setting memory 134c, which is a non-volatile latch memory.

If, for example, six regulating resistors are provided in the resistance circuit network 136c and a 6-bit correction value Daj is to be written to the mediate setting memory 134c, the correction value Daj is within a range of 0 to 63. As a design theoretical value, a correction value Daj=30 is selected when the differential voltage $\Delta V=V1-5$ is 0 V with respect to the externally measured voltage V1. If the differential voltage $\Delta V=V1-5$ increases, the correction value Daj is increased to decrease the combined resistance of the resistance circuit network 136c. If the differentia voltage $\Delta V=V1-5$ decreases, the correction value Daj is decreased to increase the combined resistance of the resistance circuit network 136c. Thus, the setting voltage applied to the non-inverted input terminal of the comparison amplifying circuit 137 is adjusted to decrease or increase.

A communication control circuit unit 140c is constituted mainly by an auxiliary microprocessor SCPU and includes a non-volatile auxiliary program memory 150 such as mask ROM memory, a RAM memory 151 for arithmetic processing, and a non-volatile second data memory 152. The communication control circuit unit 140c is serially connected with the microprocessor 110c via a pair of serial-parallel converters, not shown.

Figure 14:
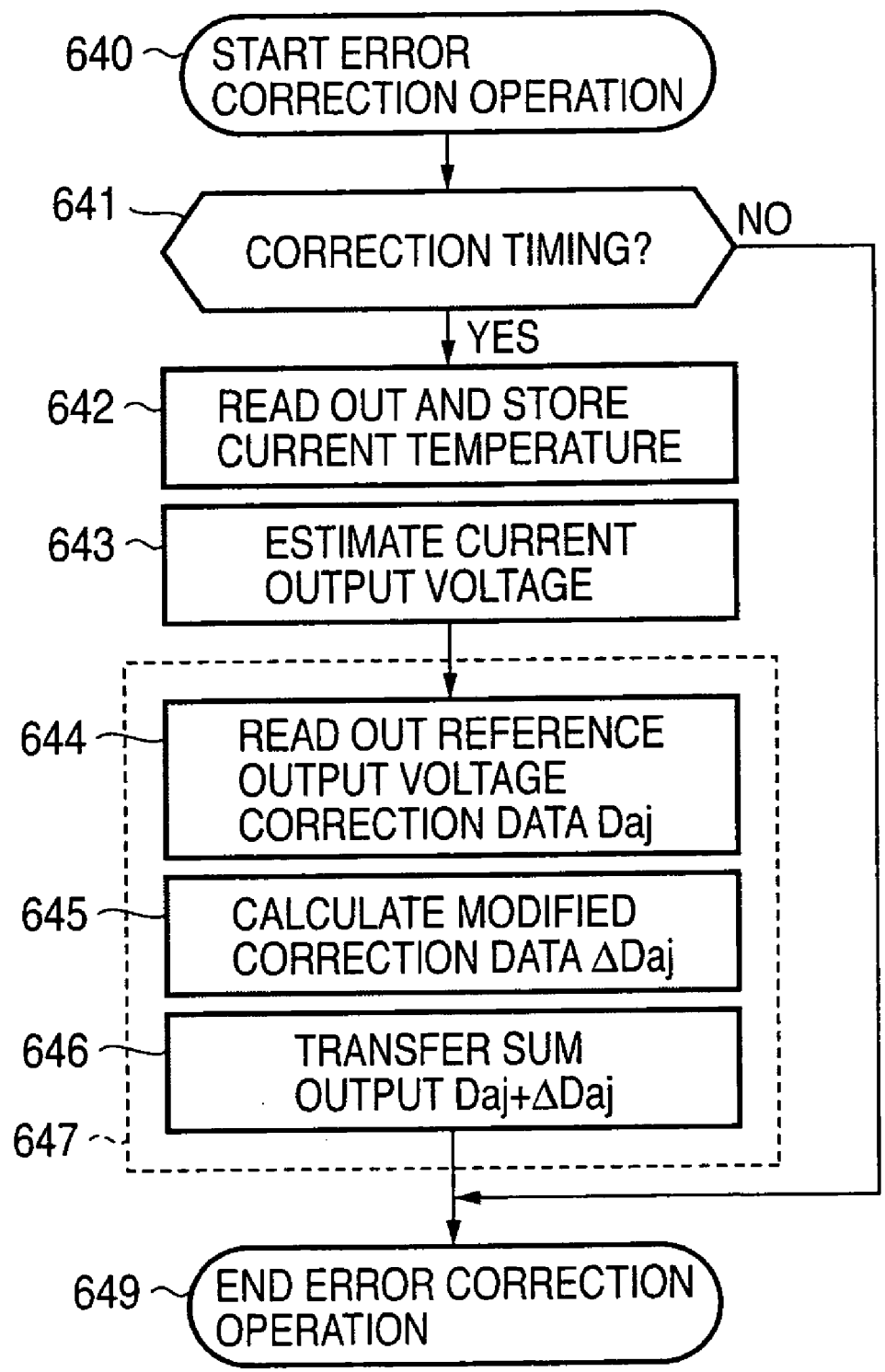
FIG. 14 is a flowchart for explaining a correction operation during the operation of the device shown in FIG. 11.

In this Embodiment 3, various programs and control constant data, which will be described later with reference to FIGS. 13 and 14, are stored in the auxiliary program memory 150 and the second data memory 152. The auxiliary microprocessor SCPU, instead of the microprocessor 110c, executes calibration control of FIG. 13 and error correction control of FIG. 14.

The communication control circuit unit 140c transfers and writes output voltage correction data calculated by the auxiliary microprocessor SCPU to the second data memory 152, sends ON/OFF information of the open/close sensor group 103b and an analog signal from the analog sensor group 104b to the microprocessor 110c, and performs ON/OFF control of the electric load group 105b in accordance with an output control signal from the microprocessor 110c.

Input interface circuits 113a and 113b, an analog interface circuit 114a, output interface circuits 115a and 115b, and a serial interface 117 are formed similarly to those of device shown in FIG. 1, and are connected between the open/close sensor groups 103a and 103b, the analog sensor group 104a, the electric load groups 105a and 105b, the external tool 107a, and the microprocessor 110c or the communication control circuit unit 140c.

An analog interface circuit 114b inputs an analog signal of the analog sensor group 104b to a second multi-channel AD converter 154. The digital value converted by the second multi-channel AD converter 154 is sent to the microprocessor 110c via the auxiliary microprocessor SCPU.

Of the analog sensors 104 shown in FIG. 1, analog sensors that perform relatively slow operations such as water temperature sensor, oil temperature sensor and atmospheric pressure sensor are handled as the sensor group 104b in FIG. 11, whereas the other sensors such as accelerator position sensor, throttle position sensor and air flow sensor are handled as the sensor group 104a.

A constant-current circuit 139a is a circuit that is fed from the output terminal of the power transistor 131a and supplies a predetermined constant current to a temperature detector 139b. The temperature detector 139b generates a both-end voltage corresponding to the ambient temperature of the constant-voltage power supply circuit unit. This both-end voltage is inputted as a temperature detection voltage Tp to the second multi-channel AD converter 154 via the analog interface circuit 114b.

Hereinafter, component inspection in the device shown in FIG. 11 will be described with reference to the block diagram of FIG. 12.

Figure 12:
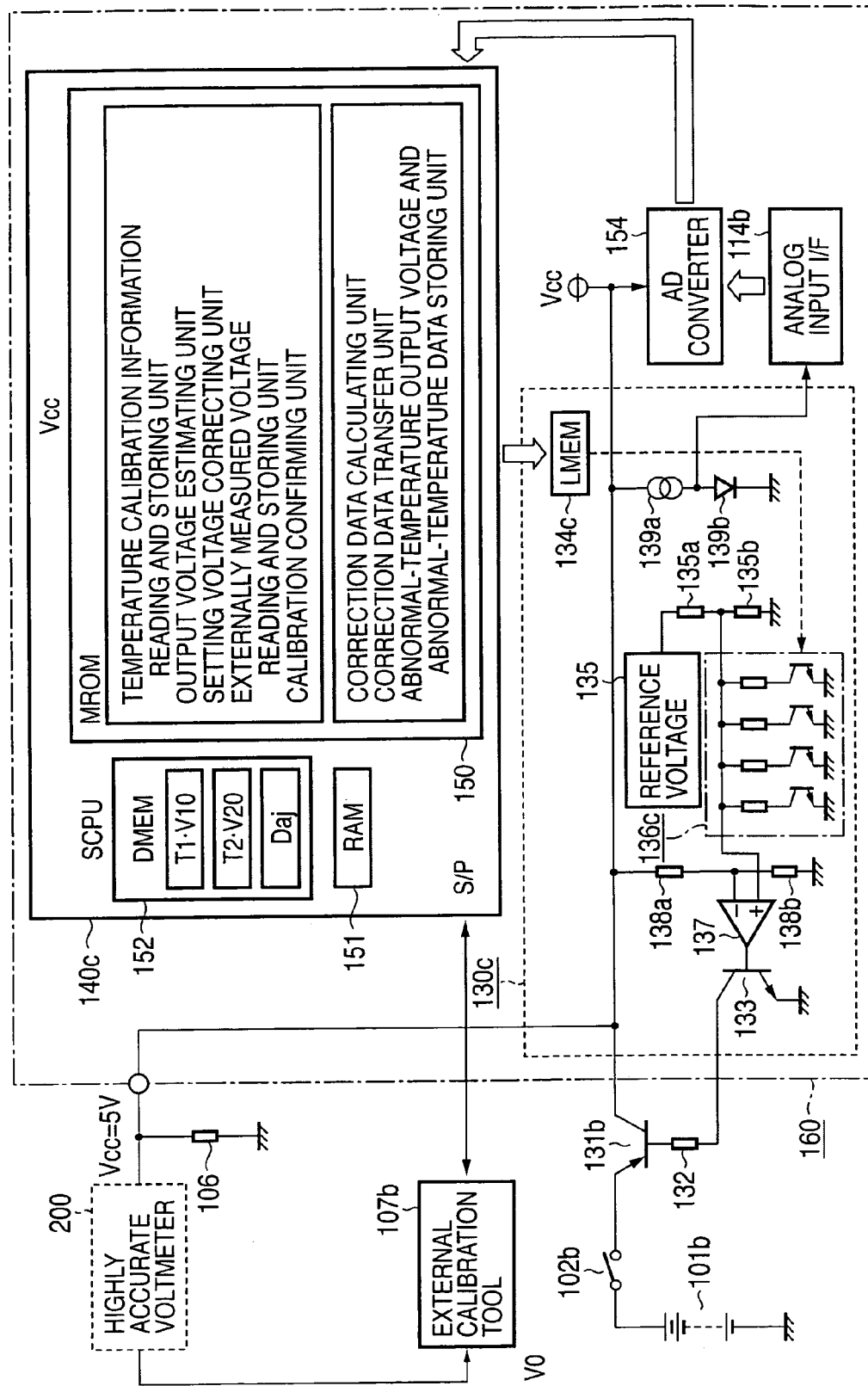
FIG. 12 is a structural block diagram showing component inspection in the device shown in FIG. 11.

In FIG. 12, a parallel-usage control circuit unit 160 is an integrated circuit device formed mainly by the communication control circuit unit 140c and the output voltage regulating circuit unit 130c. The parallel-usage control circuit unit 160 includes small circuit components excluding heat generating components and large capacitors such as large resistors and power transistor, of the input interface circuits 113a and 113b, the analog interface circuits 114a and 114b, and the output interface circuits 115a and 115b, and also includes the second multi-channel AD converter 154 and the serial interface 117.

An alternative power transistor 131b having the base resistor 132 is connected to a position equivalent to the power transistor 131a and is fed from an external power supply 101b equivalent to the vehicle-borne battery 101a via a power switch 102b.

An alternative load circuit 106 is a load resistor for causing a current equivalent to an average load current of the power transistor 131a in the vehicle-borne electronic control device 100c to flow through the alternative power transistor 131b.

A highly accurate voltmeter 200 measures the output voltage of the alternative power transistor 131b and sends the measured output voltage to an external calibration tool 107b.

The main control unit in the component inspection resides in the auxiliary microprocessor SCPU cooperating with the auxiliary program memory 150. When the power switch 102b is closed, the auxiliary microprocessor SCPU executes calibration control, which will be described later with reference to FIG. 13, and writes output voltage correction data Daj, calibration reference temperature data T1, abnormal-temperature output voltage V20, abnormal-temperature environment temperature data T2 and the like to the second data memory 152.

An output voltage V10 of the constant-voltage power supply circuit unit at the calibration reference temperature T1 is the target value of the constant-voltage output Vcc. Since its error at the time of calibration is very small, the target value of Vcc can be applied as it is.

The parallel-usage control circuit unit 160 in which the various control constants are thus written in the component inspection is incorporated and used in the vehicle-borne electronic control device 100c. Calibration confirmation processing for the vehicle-borne electronic control device 100c is performed in the state where the parallel-usage control circuit unit 160 is connected with the actual power transistor 131a and various real loads. During the operation of the vehicle-borne electronic control device 100c, error correction control shown in FIG. 14 is performed.

(2) Detailed Description of Effects and Operations of Embodiment 3

Next, operations in the calibration control block constructed as shown in FIG. 12 will be described with reference to the flowchart of FIG. 13.

In FIG. 13, at step 930, as the power switch 102b is closed and the external calibration tool 107b is connected so that an adjustment operation mode is selected, the auxiliary microprocessor SCPU starts the adjustment operation. At the next step 931a, it is judged whether a normal-temperature adjustment completion flag is set at step 938a, which will be described later. If the flag is already set, the processing shifts to operation end step 931b. If the flag is not set, the processing shifts to step 932a.

At step 932a, the digitally converted value of the temperature detection voltage Tp detected by the temperature detector 139b is read out and stored into the second data memory 152 as calibration reference temperature data T1.

At the next step 933a, the measured voltage of the highly accurate voltmeter 200 is read out and temporarily stored into the RAM memory 151 via the external calibration tool 107b. At the next step 934a, it is judged whether the differential voltage $\Delta V = V1-5$ between the externally measured voltage V1 read out and temporarily stored at step 933a and the true target value of the constant-voltage output Vcc, for example, DC 5 V, is a normal value within a predetermined threshold range. If it is a normal value, the processing shifts to step 937a. If it is not a normal value, the processing shifts to step block 935a.

At step block 935a, output voltage correction data (hereinafter simply referred to as correction data Daj or correction value Daj) is calculated in accordance with the differential voltage $\Delta V = V1-5$, as described above with reference to FIG. 5.

At step 936a following step block 935a, it is judged whether the correction value Daj calculated at step 935a is out of an appropriate range of, for example, 2 to 61. If it is out of the range, the processing shifts to step 936c. If it is not out of the range, the processing shifts to step 935b. The circuit constant is so designed that the correction value Daj does not fall out of the range of 2 to 61 unless a product anomaly occurs.

At step 935b, the correction value Daj calculated at step block 935a is transferred to the mediate setting memory 134c via the second data memory 152. At the next step 934b, it is judged whether the differential voltage between the externally measured voltage V10 based on the correction value Daj transferred at step 935b and the true target value of the constant-voltage output Vcc, for example, DC 5 V, is a normal value within a predetermined threshold range. If it is a normal value, the processing shifts to step 937a. If it is not a normal value, the processing shifts to step 936b.

At step 936b, it is judged whether the number of times of correction at step block 935a has exceeded a predetermined number of times. If it has not exceeded the predetermined number of times, the processing returns to step block 935a. If it has exceeded the predetermined number of times, the processing shifts to step 936c. At step 936c, an anomaly warning display command is issued to the external calibration tool 107b and then the processing shifts to operation end step 939.

Step 937a is executed when the result of the judgment at step 934a or 934b is YES and the differential voltage between the externally measured voltage and the true target value of the constant-voltage output Vcc, for example, DC 5 V, is a normal value within a predetermined threshold range. At step 937a, the value of the externally measure voltage V10 is read out and stored. Practically, V10 is approximately equal to Vcc. Therefore, it is not particularly necessary to read out and store the value, as a matter of convenience.

At the subsequent step 938a, a normal-temperature adjustment completion flag is set and it is stored that the calibration completion state has been set. At the subsequent step 939, execution standby for the other control programs of the auxiliary microprocessor SCPU is performed. After that, operation start step 930 is activated again and the subsequent steps are repeated.

At step 931b, it is judged whether a high-temperature adjustment completion flag is set at step 938b, which will be described later. If the flag is already set, the processing shifts to operation end step 939. If the flag is not set, the processing shifts to step 932b.

At step 932b, the digitally converted value of the temperature detection voltage Tp detected by the temperature detector 139b when the ambient temperature of the parallel-usage control circuit unit 160 which is an integrated circuit device is changed to a high temperature or low temperature is read out and stored into the second data memory 152 as calibration reference temperature data T2.

At the next step 937b, the value of the externally measured voltage V20 is read out and stored into the second data memory 152 as a high-temperature output voltage.

At the subsequent step 938b, the high-temperature adjustment completion flag is set and it is stored that the calibration completion state is set. Then, the processing shifts to operation end step 939.

To summarize the operation flow of the adjustment operation described above, step 932a provides a temperature calibration information reading and storing unit that reads out and stores the calibration reference temperature. Step 932b provides an abnormal-temperature environment temperature data storing unit. Step 933a provides an externally measured voltage reading and storing unit. Step 934b provides a calibration confirming unit. Step block 935a provides a correction data calculating unit. Step 935b provides a correction data transfer unit. Step 936a provides a correction value limiting unit. Step 936b provides a re-transfer unit (number-of-times-of-correction limiting unit). Step 936c provides an anomaly notifying unit. Step 937a provides a normal-temperature output voltage storing unit. Step 937b provides an abnormal-temperature voltage storing unit.

In Embodiment 3, the calibration processing is performed in the component inspection of the parallel-usage control circuit unit 160, which is an integrated circuit device. However, it is possible to perform the calibration processing using the auxiliary microprocessor SCPU in the production of the vehicle-borne electronic control device 100c having the auxiliary microprocessor SCPU.

It is also possible to perform the calibration processing mainly by the microprocessor 110c and the external tool 107a without depending on the auxiliary microprocessor SCPU, in the production of the vehicle-borne electronic control device 100c having the auxiliary microprocessor SCPU.

Now, the operation of the error correcting unit in the case where the vehicle-borne electronic control device 100b constructed as shown in FIG. 11 is carried on an actual vehicle will be described with reference to the flowchart of FIG. 14.

Prior to the driving operation, various programs are transferred from the external tool 107a to the program memory 120c. The external tool 107a is disconnected, or the adjustment operation mode is canceled to shift to the monitor mode by operating the keyboard in the external tool 107a.

In FIG. 14, at step 640, as the power switch 102a is closed, the auxiliary microprocessor SCPU starts the error correction operation. At the next step 641, it is judged whether it is the error correction timing now or not. If it is not the error correction timing, the processing shifts to operation end step 649. If it is the error correction timing, the processing shifts to step 642.

The result of the judgment of the error correction timing at step 641 is YES, for example, at the time of initial operation immediately after the power switch 102a is closed. After the power switch 102a is closed, the result of judgment becomes YES every predetermined cycle.

At step 642, the current measured temperature T measured by the temperature detector 139b is read out and stored into the RAM memory 151. At the next step 643, the current output voltage indicated by the straight line 800b in FIG. 8A is calculated and stored as an estimated output voltage V to the RAM memory 151.

The reference control constants for calculating this estimated output voltage V are the calibration reference temperature T1, calibration output voltage V10 (or target output voltage), abnormal-temperature environment temperature T2 and abnormal-temperature output voltage V20 stored in the second data memory 152.

At the subsequent step 644, the output voltage correction data Daj stored in the second data memory 152 is read out. At the next step 645, modified output voltage correction data ΔDaj necessary for modifying the current output voltage calculated at step 643 to the target output voltage is calculated. At the next step 646, algebraic addition of the modified output voltage correction data ΔDaj at the current temperature T calculated at step 645 to the output voltage correction data Daj at the calibration reference temperature T1 read out at step 644 is performed and the result is transferred to the mediate setting memory 134c.

If the result of the judgment at step 641 is NO, or at operation end step 649 following step 646, the auxiliary microprocessor SCPU executes the other control operations. As a predetermined time has passed, operation start step 640 is activated and the subsequent steps are repeated.

In the above-described flow of error correction operation, step 643 provides the output voltage estimating unit described with reference to FIG. 8A, and step block 647 formed by steps 644 to 646 provides the output voltage correcting unit.

(3) Description of Construction and Features of Embodiment 3

As is clear from the above description, the vehicle-borne electronic control device 100c according to Embodiment 3 of this invention includes the microprocessor 110c that has the non-volatile program memory 120c and the first data memory 122c storing the control programs and control constants transferred and written via the external tool 107a and that also has the RAM memory 121 for arithmetic processing. The vehicle-borne electronic control device 100c also has the constant-voltage power supply circuit unit, the output voltage regulating circuit unit 130c cooperating with the non-volatile second data memory 152, the multi-channel AD converter 124, and the temperature detector 139b.

The output voltage regulating circuit unit 130c is formed as a single integrated circuit device including at least the communication control circuit unit 140c and the second multi-channel AD converter 154.

The communication control circuit unit 140c is serially connected with the microprocessor 110c. At the stage of component inspection of the parallel-usage control circuit unit 160, which is the integrated circuit device, the communication control circuit unit 140c is serially connected with the external calibration tool 107b.

The external calibration tool 107b is an inspection facility to write the output voltage correction data Daj and at least the calibration reference temperature data T1 at the time of calibration to the second data memory 152.

The second multi-channel AD converter 154 is an AD converter that digitally converts the temperature near the constant-voltage power supply circuit unit detected by the temperature detector 139b and inputs the digitally converted temperature to the communication control circuit unit 140c.

Therefore, there are advantages that the output voltage regulating circuit unit 130c can be easily connected with the microprocessor 110c or the external calibration tool 107b, and that the calibration operation can be performed at the component stage by using the simple external calibration tool 107b.

Moreover, since the heat capacity is small at the component stage, there is an advantage that calibration at varied ambient temperature can be performed easily.

The communication control circuit unit 140c further includes the auxiliary program memory 150 and the auxiliary RAM memory 151 that cooperate with the auxiliary microprocessor SCPU. All or a part of the programs that provide the temperature calibration information reading and storing unit, output voltage estimating unit, abnormal-temperature output voltage storing unit, abnormal-temperature environment temperature data storing unit, and AD conversion value correcting unit or output voltage correcting unit, are stored in the auxiliary program memory 150. These programs are executed by the auxiliary microprocessor SCPU instead of the microprocessor 110c.

Therefore, there are advantages that the control burden on the microprocessor 110c can be reduced and that the function of the external calibration tool 107b in the component inspection is simplified.

The auxiliary program memory 150 further contains the programs that provide the abnormal-temperature output voltage storing unit 937b and the abnormal-temperature environment temperature data storing unit 932b for an abnormal-temperature environment of a higher or lower temperature than the calibration reference temperature.

The abnormal-temperature output voltage storing unit 937b writes and saves the value of the externally measured voltage V20 in the abnormal-temperature environment to the second data memory 152 as an abnormal-temperature output voltage.

The abnormal-temperature environment temperature data storing unit 932b writes and saves the digitally converted value of the detected voltage of the temperature detector 139b at the time when the abnormal-temperature output voltage V20 is measured, to the second data memory 152, as an abnormal-temperature environment temperature.

The output voltage estimating unit 643 calculates the output voltage at the current detected temperature from the correlation between the target output voltage of the constant-voltage power supply circuit unit or the externally measured voltage V10 at the calibration reference temperature T1 and the externally measured voltage V20 at the abnormal-temperature environment temperature T2.

The variation characteristics are measured and stored with respect to the actual product even if the variation characteristic of the output voltage due to the temperature change differs among individual products. Therefore, there is an advantage that the output voltage at the current temperature can be accurately estimated by interpolation.

Moreover, there is an advantage that the difference and variation among individual temperature detectors 139b do not affect the estimation of the output voltage.

The output voltage regulating circuit unit 130c has the mediate setting memory 134c, and the auxiliary program memory 150 further contains the program that provides the output voltage correcting unit 647, which is one of the error correcting units.

The mediate setting memory 134c, instead of the second data memory 152, performs continuity control of the open/close elements that perform variable control of the combined resistance of the resistance circuit network 136c. The output voltage correction data Daj stored in the second data memory 152 is transferred as an initial value to the mediate setting memory 134c. As a result, when the constant-voltage power supply circuit unit is at a reference ambient temperature, the open/close elements are selectively continued to generate a predetermined constant-voltage output Vcc.

The output voltage correcting unit 647 calculates the modified output voltage correction data ΔDaj corresponding to the differential voltage ΔV between the output voltage estimated by the output voltage estimating unit 643 and the target output voltage, and performs algebraic addition of the modified output voltage correction data ΔDaj to the output voltage correction data stored in the mediate setting memory 134c.

Therefore, there is an advantage that the correction of the output voltage based on the combination of the component variation correction amount and the temperature variation correction amount can be performed by using the single resistance circuit network 136c.

The auxiliary program memory 150 further contains the programs that provide the externally measured voltage reading and storing unit 933a, the calibration confirming unit 934b, and the correction data calculating and transfer units 935a and 935b.

The externally measured voltage reading and storing unit 933a causes the highly accurate voltmeter 200 provided outside of the vehicle-borne electronic control device 100c to measure the output voltage of the constant-voltage power supply circuit unit, and transfers and temporarily stores the measured voltage into the RAM memory 151 in the vehicle-borne electronic control device 100c via the external calibration tool 107b.

The calibration confirming unit 934b reads out the externally measured voltage V10 measured by the highly accurate voltmeter 200 and confirms whether the difference between the externally measured voltage V10 and the target value of the output voltage is corrected to fall within an allowable error range.

When the result of the judgment by the calibration confirming unit 934b shows that the difference is too large, the correction data calculating and transfer units 935a and 935b are executed. These units calculate the correction data Daj in response to the differential voltage ΔV between the externally measured voltage V10 and the target value of the output voltage, and transfer and rewrite the output voltage correction data into the second data memory 152.

The externally measured voltage reading and storing unit 933a, the calibration confirming unit 934b, and the correction data calculating and transfer unit 935a and 935b constitute the calibration control unit executed in the inspection of components including at Least the output voltage regulating circuit unit or in the adjustment operation of the vehicle-borne electronic control device 100c.

Therefore, even if there are difference and variation of individual circuit components, the output voltage of the constant-voltage power supply circuit unit is corrected by the output voltage correction data. Since this correction data is calculated within the vehicle-borne electronic control device 100c, there are advantages that the tool for adjustment for shipment is simplified and that a standardized external tool can be used for the vehicle-borne electronic control devices 100c of various specifications.

Since the calibration control is not executed during the actual vehicle operation of the microprocessor 110c, there is an advantage that the control burden on the microprocessor 110c does not increase.

The highly accurate voltmeter 200, which is the test inspection facility, is a voltmeter having accuracy equivalent to or higher than the minimum unit of the output voltage that can be regulated by the second data memory 152. The measured voltage measured by the highly accurate voltmeter 200 is read out and temporarily stored as digital data into the RAM memory 151 by the externally measured voltage reading and storing unit 933a via the external calibration tool 107b.

Therefore, there is an advantage that highly accurate output voltage correction data Daj can be calculated on the basis of digital data having sufficiently high resolution.

The calibration confirming unit 934b further includes the re-transfer unit 936b, at least one control unit of either the correction value limiting unit 936a or the number-of-times-of-correction limiting unit 936b, and the anomaly notifying unit 936c.

The re-transfer unit 936b acts when the target difference confirmed by the calibration confirming unit 934b is too large. It calculates correction data Daj again in accordance with the differential voltage ΔV between the externally measured voltage V10 updated, read out and the temporarily stored by the externally measured voltage reading and storing unit 933a and the target value of the output voltage, and rewrites and transfers the new output voltage correction data Daj to the second data memory 152.

The correction value limiting unit 936a stops the calibration operation when the correction value calculated by the correction data calculating unit 935a exceeds a predetermined allowable value.

The number-of-times-of-correction limiting unit 936b stops the calibration operation when the difference between the externally measured voltage V10 and the target value of the output voltage is not corrected to fall within the allowable error range even if the number of times of correction processing, update and transfer by the re-transfer unit 936b exceeds a predetermined number of times.

The anomaly notifying unit 936c acts when the correction value limiting unit 936a or the number-of-times-of-correction limiting unit 936b has stopped the calibration operation. It gives a warning and display of a calibration-disabled state to the external calibration tool 107b.

Therefore, there is an advantage that a product that cannot be adjusted to a normal output voltage can be detected- and eliminated at the stage of adjustment for shipment.

The correction data calculating unit 935b transfers first and second output voltage correction data Daj1 and Daj2 to the second data memory 152 as a tentative value, calculates differential voltages $\Delta V1=V01--Vcc$ and $\Delta V2=V02-Vcc$ between externally measured voltages V01 and V02 read out and stored by the externally measured voltage reading and storing units 502a and 502b and the target value Vcc of the output voltage corresponding to the correction data Daj1 and Daj2, and calculates output voltage correction data Daj for a differential voltage of 0 by interpolation calculation based on the differential voltages $\Delta V1$ and $\Delta V2$ corresponding to the correction data Daj1 and Daj2.

Therefore, there is an advantage that the accurate output voltage correction data Daj can be calculated easily by the simple calculating unit.

Embodiment 4 of the Invention (1) Detailed Description of Structure of Embodiment 4

Hereinafter, the overall structure of a device according to a fourth embodiment of this invention will be described with reference to the block diagram of FIG. 15, mainly with respect to the differences from the device shown in FIG. 1.

Figure 15:
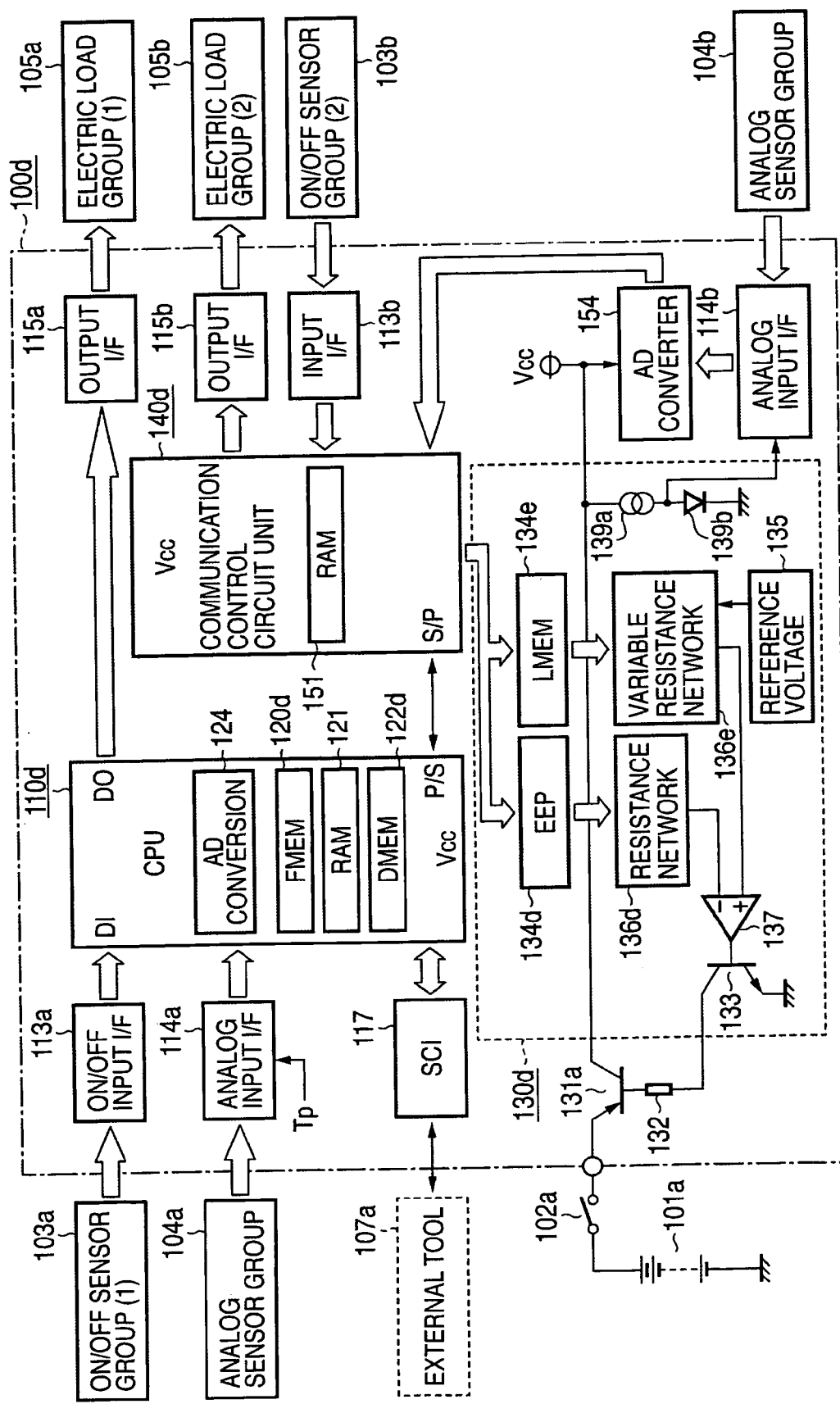
FIG. 15 is a block diagram showing an overall structure of a device according to a fourth embodiment of this invention.

In FIG. 15, a vehicle-borne electronic control device 100d is fed from a vehicle-borne battery 101a via a power switch 102a and controls electric load groups 105a and 105b in accordance with the ON/OFF state of open/close sensor groups 103a and 103b and the signal level of analog sensor groups 104a and 104b. An external tool 107a is a setting and display device that is connected to the vehicle-borne electronic control device 100d when conducting shipment inspection on the production line of the vehicle-borne electronic control device 100d, shipment inspection on the production line of an automobile, or maintenance and inspection at a service shop.

A microprocessor 110d cooperates with a non-volatile program memory 120d, a RAM memory 121 for arithmetic processing, a non-volatile first data memory 122d, and a multi-channel AD converter 124, and forms the main unit for control operation of the vehicle-borne electronic control device 100d.

An output voltage regulating circuit unit 130d has resistance circuit networks 136d and 136e. Each of the resistance circuit networks 136d and 136e is formed by plural regulating resistors changing at multiplication factors of 1:2:4:8 ... and open/close elements connected in series with the regulating resistors. The open/close elements are connected to open or close in accordance with the logical level of each output bit of a second data memory 134d or a variable setting memory 134e.

The resistance circuit network 136d is connected to an inverted input of a comparison amplifying circuit 137 that controls the continuity of a power transistor 131a via a transistor 133 and a base resistor 132, and the resistance circuit network 136e is connected to its non-inverted input.

A communication control circuit unit 140d includes a RAM memory 151 and a logical circuit unit, not shown, and is serially connected with the microprocessor 110d via a pair of serial-parallel converters, not shown.

Figure 18:
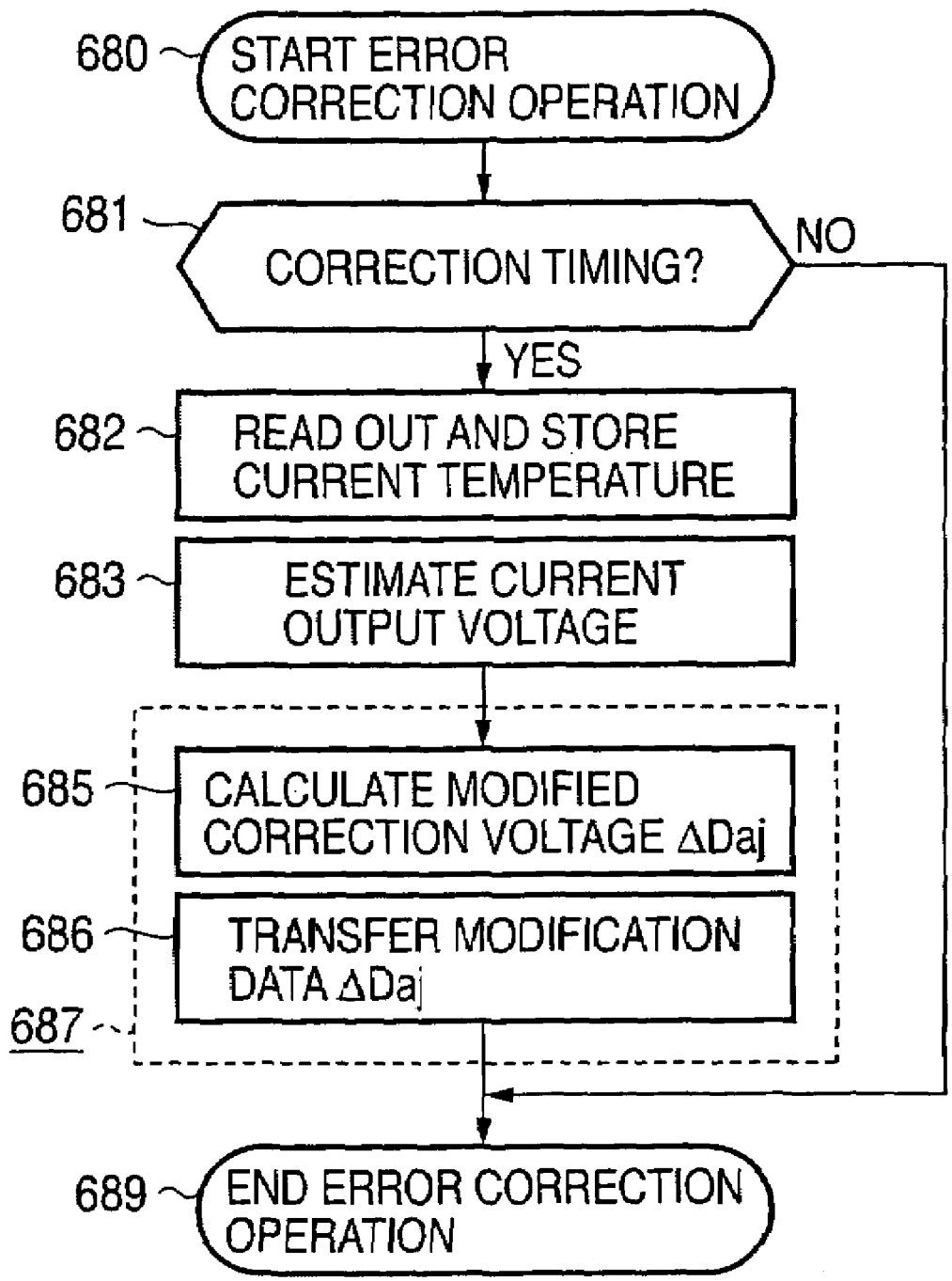
FIG. 18 is a flowchart for explaining a correction operation during the operation of the device shown in FIG. 15.

In this Embodiment 4, various programs and control constant data, which will be described later with reference to FIGS. 17 and 18, are stored in the program memory 120d and the first data memory 122d. The microprocessor 110d executes calibration control of FIG. 17 and error correction control of FIG. 18.

The communication control circuit unit 140d transfers and writes output voltage correction data calculated by the microprocessor 110d to the second data memory 134d, sends ON/OFF information of the open/close sensor group 103b and an analog signal from the analog sensor group 104b to the microprocessor 110d, and performs ON/OFF control of the electric load group 105b in accordance with an output control signal from the microprocessor 110d.

Input interface circuits 113a and 113b, an analog interface circuit 114a, output interface circuits 115a and 115b, and a serial interface 117 are formed similarly to those of device shown in FIG. 1, and are connected between the open/close sensor groups 103a and 103b, the analog sensor group 104a, the electric load groups 105a and 105b, the external tool 107a, and the microprocessor 110d or the communication control circuit unit 140d.

An analog interface circuit 114b inputs an analog signal of the analog sensor group 104b to a second multi-channel AD converter 154. The digital value converted by the second multi-channel AD converter 154 is sent to the microprocessor 110d via the communication control circuit unit 140d.

A constant-current circuit 139a is a circuit that is fed from the output terminal of the power transistor 131a and supplies a predetermined constant current to a temperature detector 139b. The temperature detector 139b generates a both-end voltage corresponding to the ambient temperature of the constant-voltage power supply circuit unit. This both-end voltage is inputted as a temperature detection voltage Tp to the second multi-channel AD converter 154 via the analog interface circuit 114b.

Hereinafter, calibration control in the device shown in FIG. 15 will be described with reference to the block diagram of FIG. 16.

Figure 16:
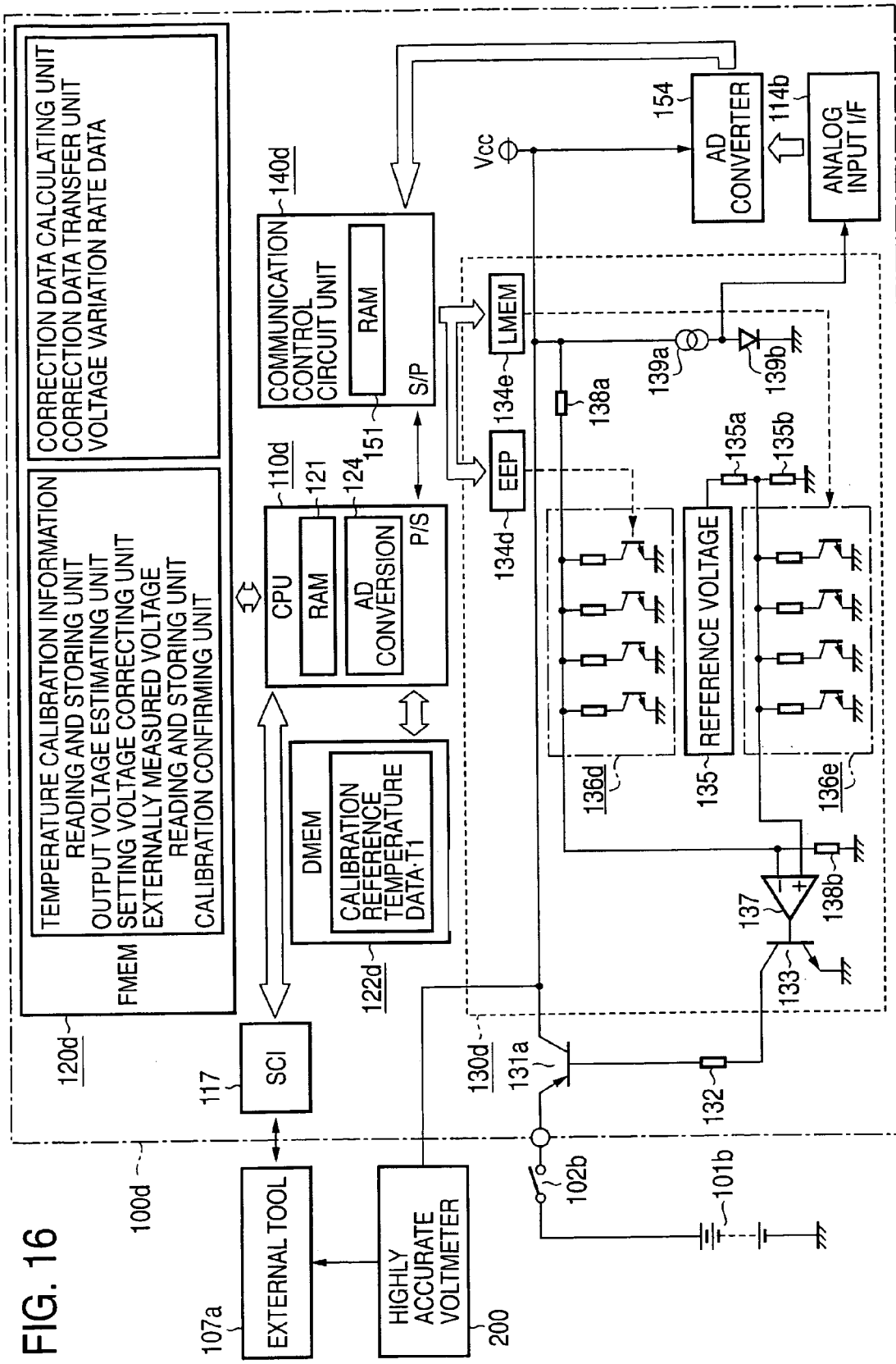
FIG. 16 is a block diagram showing calibration control in the device shown in FIG. 15.

In FIG. 16, an external power supply 101b, which is equivalent to the vehicle-borne battery 101a, is a facility to feed the vehicle-borne electronic control device 100d when performing an adjustment operation via a power switch 102b.

A highly accurate voltmeter 200, which is a facility for the adjustment operation, measures the output voltage of the power transistor 131a in the vehicle-borne electronic control device 100d and sends the digital value of the measured voltage to the RAM memory 121 via the external tool 107a, the serial interface 117 and the microprocessor 110d.

As the reference voltage Vref of the multi-channel AD converter 124 cooperating with the microprocessor 110d, the constant-voltage output Vcc of the constant-voltage power supply circuit unit is used as it is.

The non-volatile memory 120d cooperating with the microprocessor 110d contains a program that provides a calibration control unit, which will be described later with reference to FIG. 17, and a program and reference constant data that provide an error correcting unit, which will be described in detail with reference to FIG. 18.

In the first data memory 122d cooperating with the microprocessor 110d, calibration reference temperature data T1 is stored, which represents the digitally converted value of the output voltage of the temperature detector 139b at the time of calibration of the output voltage of the constant-voltage power supply circuit unit.

To the second data memory 134d provided in the output voltage regulating circuit unit 130d, output voltage correction data Daj is transferred from the microprocessor 110d via the communication control circuit unit 140d so as to regulate the combined resistance of the resistance circuit network 136d.

This output voltage correction data Daj is calculated by the microprocessor 110d in the above-described manner shown in FIG. 5.

To the variable setting memory 134e provided in the output voltage regulating circuit unit 130d, modified output voltage correction data ΔDaj (hereinafter also referred to simply as modification value ΔDaj) is transferred from the microprocessor 110d via the communication control circuit unit 140d so as to regulate the combined resistance of the resistance circuit network 136e. This modification value ΔDaj is calculated by the microprocessor 110d in a manner that will be described later with reference to FIG. 18.

The resistance circuit network 136d is connected parallel to a voltage-dividing resistor 138b, of voltage-dividing resistors 138a and 138b that divide the output voltage of the power transistor 131a. The divided voltage is applied to the inverted input of the comparison amplifying circuit 137.

If, for example, six regulating resistors are provided in the resistance circuit network 136d and a 6-bit correction value Daj is to be written to the second data memory 134d, the correction value Daj is within a range of 0 to 63. As a design theoretical value, a correction value Daj=30 is selected when the differential voltage ΔV=V1−5 is 0 V with respect to the externally measured voltage V1. If the differential voltage ΔV=V1−5 increases, the correction value Daj is decreased to increase the combined resistance of the resistance circuit network 136d. If the differentia voltage ΔV=V1−5 decreases, the correction value Daj is increased to decrease the combined resistance of the resistance circuit network 136d. Thus, the setting voltage applied to the non-inverted input terminal of the comparison amplifying circuit 137 is adjusted to increase or decrease.

On the other hand, the resistance circuit network 136e is connected parallel to a voltage-dividing resistor 135b, of voltage-dividing resistors 135a and 135b that divide the output voltage of the reference voltage generating circuit 135. The divided voltage is applied to the non-inverted input of the comparison amplifying circuit 137.

If, for example, six regulating resistors are provided in the resistance circuit network 136e and a 6-bit modification value ΔDaj is to be written to the variable setting memory 134e, the modification value ΔDaj is within a range of 0 to 63. As a design theoretical value, a modification value ΔDaj=30 is selected when the measured temperature T in FIG. 3A is equal to the calibration temperature T1. If the measured temperature changes and the differential voltage ΔV=V1−5 with respect to the externally measured voltage V1 increases, the modification value ΔDaj is increased to decrease the combined resistance of the resistance circuit network 136e. If the differentia voltage ΔV=V1−5 decreases, the modification value ΔDaj is decreased to increase the combined resistance of the resistance circuit network 136e. Thus, the setting voltage applied to the non-inverted input terminal of the comparison amplifying circuit 137 is adjusted to decrease or increase.

(2) Detailed Description of Effects and Operations of Embodiment 4

Next, operations in the calibration control block constructed as shown in FIG. 16 will be described with reference to the flowchart of FIG. 17.

Prior to the driving operation, various programs are transferred from the external tool 107a to the program memory 120d by a boot program, not shown, cooperating with the microprocessor 110d. The programs transferred here include a communication control program, an input/output control program, basic information such as control constant data, as well as programs and reference data to provide a calibration control unit and an error correcting unit.

In FIG. 17, at step 470, as the power switch 102b is closed and the external tool 107a is connected so that an adjustment operation mode is selected, the microprocessor 110d starts the adjustment operation. At the next step 471, it is judged whether a normal-temperature adjustment completion flag is set at step 478a, which will be described later. If the flag is already set, the processing shifts to operation end step 479. If the flag is not set, the processing shifts to step 472a.

At step 472a, the digitally converted value of the temperature detection voltage Tp detected by the temperature detector 139b is read out and stored into the first data memory 122d as calibration reference temperature data T1.

At the next step 473a, the measured voltage of the highly accurate voltmeter 200 is read out and temporarily stored into the RAM memory 121 via the external tool 107a. At the next step 474a, it is judged whether the differential voltage ΔV=V1−5 between the externally measured voltage V1 read out and temporarily stored at step 473a and the true target value of the constant-voltage output Vcc, for example, DC 5 V, is a normal value within a predetermined threshold range. If it is a normal value, the processing shifts to step 477a. If it is not a normal value, the processing shifts to step block 475a.

At step block 475a, output voltage correction data (hereinafter simply referred to as correction data Daj or correction value Daj) is calculated in accordance with the differential voltage ΔV=V1−5, as described above with reference to FIG. 5.

At step 476a following step block 475a, it is judged whether the correction value Daj calculated at step 475a is out of an appropriate range of, for example, 2 to 61. If it is out of the range, the processing shifts to step 476c. If it is not out of the range, the processing shifts to step 475b. The circuit constant is so designed that the correction value Daj does not fall out of the range of 2 to 61 unless a product anomaly occurs.

At step 475b, the correction value Daj calculated at step block 475a is transferred to the second data memory 134d. At the subsequent step 475c, a modification value ΔDaj corresponding to the calibration temperature T1 read out at step 472a is transferred to the variable setting memory 134e. At the next step 474b, it is judged whether the differential voltage between the externally measured voltage V10 based on the correction value Daj and the modification value ΔDaj transferred at steps 475b and 475c and the true target value of the constant-voltage output Vcc, for example, DC 5 V, is a normal value within a predetermined threshold range. If it is a normal value, the processing shifts to step 477a. If it is not a normal value, the processing shifts to step 476b.

At step 476b, it is judged whether the number of times of correction at step block 475a has exceeded a predetermined number of times. If it has not exceeded the predetermined number of times, the processing returns to step block 475a. If it has exceeded the predetermined number of times, the processing shifts to step 476c. At step 476c, an anomaly warning display command is issued to the external tool 107a and then the processing shifts to operation end step 479.

Step 477a is executed when the result of the judgment at step 474a or 474b is YES and the differential voltage between the externally measured voltage and the true target value of the constant-voltage output Vcc, for example, DC 5 V, is a normal value within a predetermined threshold range. At step 477a, the value of the externally measure voltage V10 is read out and stored. Practically, V10 is approximately equal to Vcc. Therefore, it is not particularly necessary to read out and store the value, as a matter of convenience.

At the subsequent step 478a, a normal-temperature adjustment completion flag is set and it is stored that the calibration completion state has been set. At the subsequent operation end step 479, execution standby for the other control programs of the microprocessor 110d is performed. After that, operation start step 470 is activated again and the subsequent steps are repeated.

To summarize the operation flow of the adjustment operation described above, step 472a provides a temperature calibration information reading and storing unit that reads out and stores the calibration reference temperature. Step 473a provides an externally measured voltage reading and storing unit. Step 474b provides a calibration confirming unit. Step block 475a provides a correction data calculating unit. Step 475b provides a correction data transfer unit. Step 476a provides a correction value limiting unit. Step 476b provides a re-transfer unit (number-of-times-of-correction limiting unit). Step 476c provides an anomaly notifying unit.

Now, the operation of the error correcting unit in the case where the vehicle-borne electronic control device 100d constructed as shown in FIG. 15 is carried on an actual vehicle will be described with reference to the flowchart of FIG. 18.

Prior to the driving operation, various programs are transferred from the external tool 107a to the program memory 120d. After the calibration processing shown in FIG. 17 is performed, the external tool 107a is disconnected, or the adjustment operation mode is canceled to shift to the monitor mode by operating the keyboard in the external tool 107a.

In FIG. 18, at step 680, as the power switch 102a is closed, the microprocessor 110d starts the error correction operation. At the next step 681, it is judged whether it is the error correction timing now or not. If it is not the error correction timing, the processing shifts to operation end step 689. If it is the error correction timing, the processing shifts to step 682.

The result of the judgment of the error correction timing at step 681 is YES, for example, at the time of initial operation immediately after the power switch 102a is closed. After the power switch 102a is closed, the result of judgment becomes YES every predetermined cycle.

At step 682, the current measured temperature T measured by the temperature detector 139b is read out and stored into the RAM memory 121. At the next step 683, the current output voltage indicated by the straight line 300b in FIG. 3A is calculated and stored as an estimated output voltage V to the RAM memory 121.

At the next step 685, modified output voltage correction data ΔDaj necessary for modifying the current output voltage calculated at step 683 to the target output voltage is calculated. At the next step 686, the modified output voltage correction data ΔDaj at the current temperature T calculated at step 685 is transferred to the variable setting memory 134e.

If the result of the judgment at step 681 is NO, or at operation end step 689 following step 686, the microprocessor 110d executes the other control operations. As a predetermined time has passed, operation start step 690 is activated and the subsequent steps are repeated.

In the above-described flow of error correction operation, step 683 provides the output voltage estimating unit described with reference to FIG. 3A, and step block 687 formed by steps 685 to 686 provides the output voltage correcting unit.

In Embodiment 4, at least the communication control circuit unit 140d, the output voltage regulating circuit unit 130d and the second multi-channel AD converter 154 are integrally formed as an integrated circuit device, and the calibration processing mainly by the microprocessor 110d is carried out in the production of the vehicle-borne electronic control device 100d.

However, it is possible to perform the calibration processing mainly by the external tool 107a in the production of the vehicle-borne electronic control device 100d and thus reduce the capacity of the program memory 120d.

It is also possible to perform the calibration processing mainly by an external calibration tool 107b at the component stage of the integrated circuit device even for the communication control circuit 140d that does not have an auxiliary microprocessor SCPU.

However, in the case of performing the calibration processing at the component stage, at least the value of the calibration reference temperature T1 as well as the output voltage correction data Daj must be saved in the second data memory 134d, which is a non-volatile memory. Therefore, it is necessary to use a data memory that can handle data of plural bytes.

Meanwhile, during the actual vehicle operation of the vehicle-borne electronic control device 100d, the second data memory 134d must constantly output the output voltage correction data Daj so as to selectively continue the open/close elements in the resistance circuit network 136d. Therefore, when starting the operation, the value of the calibration reference temperature data T1 may be transferred in advance to the RAM memory 151, and when calculating the modification value ΔDaj to the variable setting memory 134e, the calibration reference temperature T1 transferred to the RAM memory 151 may be used. The same applies to the case of using an abnormal-temperature output voltage or abnormal-temperature environment temperature data for temperature calibration, or the case of using an AD conversion value correcting unit instead of the output voltage correcting unit.

(3) Description of Construction and Features of Embodiment 4

As is clear from the above description, the vehicle-borne electronic control device 100d according to Embodiment 4 of this invention includes the microprocessor 110d that has the non-volatile program memory 120d and the first data memory 122d storing the control programs and control constants transferred and written via the external tool 107a and that also has the RAM memory 121 for arithmetic processing. The vehicle-borne electronic control device 100d also has the constant-voltage power supply circuit unit, the output voltage regulating circuit unit 130d cooperating with the non-volatile second data memory 134d, the multi-channel AD converter 124, and the temperature detector 139b. The program memory 120d contains the programs that provide the temperature calibration information reading and storing unit 472a, the output voltage estimating unit 683, and the error correcting unit. The second data memory 134d contains the output voltage correction data.

The constant-voltage power supply circuit unit is feed-controlled from the vehicle-borne battery 101a via the power transistor 131a, generates a predetermined constant-voltage output Vcc, and feeds at least the microprocessor 110d, the multi-channel AD converter 124, and the analog sensor group 104a connected to the multi-channel AD converter 124.

The output voltage regulating circuit unit 130d includes the reference voltage generating circuit 135 that generates the reference voltage Vs, the comparison amplifying circuit 137 that compares the magnitude of a voltage proportional to the output voltage of the constant-voltage power supply circuit unit and the magnitude of the reference voltage Vs, the resistance circuit network 136d that is added to at least one input of the comparison amplifying circuit 137 and fine-tunes a comparison input voltage, and the plural open/close elements that are selectively continued in accordance with the contents of the second data memory 134*d* and change the combined resistance value of the resistance circuit network 136*d*. The continuity of the power transistor 131*a* is controlled by the output of the comparison amplifying circuit 137, and the output voltage is negative-feedback-controlled to be a predetermined constant-voltage output Vcc proportional to the reference voltage Vs.

The detection voltage of the analog sensor group 104*a* is inputted to the multi-channel AD converter 124. When the analog input voltage of the AD converter becomes equal to the reference voltage Vref supplied from the constant-voltage power supply circuit unit, the multi-channel AD converter 124 generates a maximum digital output of predetermined resolution and selectively inputs digitally converted values of many analog inputs to the microprocessor 110*d*.

The temperature detector 139*b* is formed by a thermosensitive element that is installed near the constant-voltage power supply circuit unit and that is fed from the constant-voltage power supply circuit unit to generate the temperature detection voltage Tp corresponding to the temperature near the constant-voltage power supply circuit unit.

The output voltage correction data decides the combined resistance of the resistance circuit network 136*d* so as to reduce the difference between the output voltage of the constant-voltage power supply circuit unit and the target voltage due to characteristic variation of the components applied.

The temperature calibration information reading and storing unit 472*a* is a unit that writes and saves a digitally converted value of the detection voltage of the temperature detector 139*b* at least at the time of transfer of the output voltage correction data, as calibration reference temperature data into the first data memory 122*d*.

The output voltage estimating unit 683 is a unit that estimates the current output voltage of the constant-voltage power supply circuit unit by comparing the current detection output of the temperature detector 139*b* with the calibration reference temperature data stored in the first data memory 122*d*.

The error correcting unit is the output voltage correcting unit 687 that restrains variation of the output voltage of the constant-voltage power supply circuit unit itself on the basis of the estimated output voltage 683.

The program memory 120*d* or the first data memory 122*d* contains the voltage variation rate data. The voltage variation rate data is data of average voltage variation rate that is statistically calculated by actually measuring, in advance, the variation characteristics of output voltage in the case where the ambient temperature is changed with respect to many products. The voltage variation rate data is stored from the external tool 107*a* to the program memory 120*d* or the first data memory 122*d*. The output voltage estimating unit 683 estimates the current output voltage on the basis of the current output of the temperature detector 139*b* and the voltage variation rate data.

Therefore, there is an advantage that the current output voltage can be estimated on the basis of the measured ambient temperature even if a highly accurate voltage detecting unit is not provided as the constant-voltage power supply circuit unit.

The output voltage regulating circuit unit 130*d* has the variable setting memory 134*e* and the variable resistance circuit network 136*e*, in addition to the second data memory 134*d* and the resistance circuit network 136*d*. The program memory 120*d* further contains the program that provides the output voltage correcting unit 687, which is one of the error correcting units.

The variable setting memory 134*e* is a non-volatile memory storing the modified output voltage correction data ΔDaj for the constant-voltage power supply circuit unit 130*d* to generate a predetermined constant-voltage output Vcc at the current ambient temperature.

The variable resistance circuit network 136*e* is added to at least one input of the comparison amplifying circuit 137 and fine-tunes the comparison input voltage. The variable resistance circuit network 136*e* has plural open/close elements that change the combined resistance value of the resistance circuit network 136*e*, and the open/close elements are selectively continued in accordance with the contents in the variable setting memory 134*e*.

The output voltage correcting unit 687 calculates the modified output voltage correction data ΔDaj corresponding to the differential voltage between the output voltage estimated by the output voltage estimating unit 683 and the target output voltage, and stores the modified output voltage correction data ΔDaj into the variable setting memory 134*e*.

Therefore, there is an advantage that since component variation correction and temperature variation correction can be separately performed, the correction processing can be simplified.

The output voltage regulating circuit unit 130*d* is formed as a single integrated circuit device including at least the communication control circuit unit 140*d* and the second multi-channel AD converter 154.

The communication control circuit unit 140*d* is serially connected with the microprocessor 110*d*. At the stage of component inspection of the integrated circuit device, the communication control circuit unit 140*d* is serially connected with the external calibration tool.

The external calibration tool is an inspection facility to write the output voltage correction data and at least the calibration reference temperature data at the time of calibration to the second data memory 134*d*.

The second multi-channel AD converter 154 is an AD converter that digitally converts the temperature near the constant-voltage power supply circuit unit detected by the temperature detector 139*b* and inputs the digitally converted temperature to the communication control circuit unit 140*d*.

Therefore, there are advantages that the output voltage regulating circuit unit 130*d* can be easily connected with the microprocessor 110*d* or the external calibration tool, and that the calibration operation can be performed at the component stage by using the simple external calibration tool.

Moreover, since the heat capacity is small at the component stage, there is an advantage that calibration at varied ambient temperature can be performed easily.

The program memory 120*d* further contains the programs that provide the externally measured voltage reading and storing unit 473*a*, the calibration confirming unit 474*b*, and the correction data calculating and transfer units 475*a* and 475*b*.

The externally measured voltage reading and storing unit 473*a* causes the highly accurate voltmeter 200 provided outside of the vehicle-borne electronic control device 100*d* to measure the output voltage of the constant-voltage power supply circuit unit, and transfers and temporarily stores the measured voltage into the RAM memory 121 in the vehicle-borne electronic control device 100*d* via the external tool 107*a*.

The calibration confirming unit 474*b* reads out the externally measured voltage V10 measured by the highly accurate voltmeter 200 and confirms whether the difference between the externally measured voltage V10 and the target value of the output voltage is corrected to fall within an allowable error range.

When the result of the judgment by the calibration confirming unit 474b shows that the difference is too large, the correction data calculating and transfer units 475a and 475b are executed. These units calculate the correction data Daj in response to the differential voltage ΔV between the externally measured voltage V10 and the target value of the output voltage, and transfer and rewrite the output voltage correction data into the second data memory 134d.

The externally measured voltage reading and storing unit 473a, the calibration confirming unit 474b, and the correction data calculating and transfer unit 475a and 475b constitute the calibration control unit executed in the adjustment operation of the vehicle-borne electronic control device 100d.

Therefore, even if there are difference and variation of individual circuit components, the output voltage of the constant-voltage power supply circuit unit is corrected by the output voltage correction data. Since this correction data is calculated within the vehicle-borne electronic control device 100d, there are advantages that the tool for adjustment for shipment is simplified and that a standardized external tool 107a can be used for the vehicle-borne electronic control devices 100d of various specifications.

Since the calibration control is not executed during the actual vehicle operation of the microprocessor 110d, there is an advantage that the control burden on the microprocessor 110d does not increase.

The highly accurate voltmeter 200, which is the test inspection facility, is a voltmeter having accuracy equivalent to or higher than the minimum unit of the output voltage that can be regulated by the second data memory 134d. The measured voltage measured by the highly accurate voltmeter 200 is read out and temporarily stored as digital data into the RAM memory 121 by the externally measured voltage reading and storing unit 473a via the external tool 107a.

Therefore, there is an advantage that highly accurate output voltage correction data Daj can be calculated on the basis of digital data having sufficiently high resolution.

The calibration confirming unit 474b further includes the re-transfer unit 476b, at least one control unit of either the correction value limiting unit 476a or the number-of-times-of-correction limiting unit 476b, and the anomaly notifying unit 476c.

The re-transfer unit 476b acts when the target difference confirmed by the calibration confirming unit 474b is too large. It calculates correction data Daj again in accordance with the differential voltage ΔV between the externally measured voltage V10 updated, read out and temporarily stored by the externally measured voltage reading and storing unit 473a and the target value of the output voltage, and rewrites and transfers the new output voltage correction data Daj to the second data memory 134d.

The correction value limiting unit 476a stops the calibration operation when the correction value calculated by the correction data calculating unit 475a exceeds a predetermined allowable value.

The number-of-times-of-correction limiting unit 476b stops the calibration operation when the difference between the externally measured voltage V10 and the target value of the output voltage is not corrected to fall within the allowable error range even if the number of times of correction processing, update and transfer by the re-transfer unit 476b exceeds a predetermined number of times.

The anomaly notifying unit 476c acts when the correction value limiting unit 476a or the number-of-times-of-correction limiting unit 476b has stopped the calibration operation. It gives a warning and display of a calibration-disabled state to the external tool 107a.

Therefore, there is an advantage that a product that cannot be adjusted to a normal output voltage can be detected and eliminated at the stage of adjustment for shipment.

The correction data calculating unit 475a transfers first and second output voltage correction data Daj1 and Daj2 to the second data memory 134d as a tentative value, calculates differential voltages ΔV1=V01−Vcc and ΔV2=V02−Vcc between externally measured voltages V01 and V02 read out and stored by the externally measured voltage reading and storing units 502a and 502b and the target value Vcc of the output voltage corresponding to the correction data Daj1 and Daj2, and calculates output voltage correction data Daj for a differential voltage of 0 by interpolation calculation based on the differential voltages ΔV1 and ΔV2 corresponding to the correction data Daj1 and Daj2.

Therefore, there is an advantage that the accurate output voltage correction data Daj can be calculated easily by the simple calculating unit.

What is claimed is:

1. A vehicle-borne electronic control device comprising a microprocessor containing a non-volatile program memory storing a control program and a control constant transferred and written thereto via an external tool, a non-volatile first data memory in which learning data is stored and saved, and a RAM memory for arithmetic processing, the vehicle-borne electronic control device further comprising a constant-voltage power supply circuit unit including a power transistor and an output voltage regulating circuit unit that cooperates with a non-volatile second data memory, a multi-channel AD converter, and a temperature detector, the program memory containing a program to realize a temperature calibration information reading and storing unit, an output voltage estimating unit, and an error correcting unit, and the second data memory containing output voltage correction data, wherein the constant-voltage power supply circuit unit is feed-controlled by a vehicle-borne battery via the power transistor, generates a predetermined constant-voltage output Vcc, and feeds at least the microprocessor, the multi-channel AD converter, and an analog sensor group connected to the multi-channel AD converter, the output voltage regulating circuit unit includes a reference voltage generating circuit that generates a reference voltage Vs, a comparison amplifying circuit that compares the magnitude of a voltage proportional to the output voltage of the constant-voltage power supply circuit unit and the magnitude of the reference voltage Vs, a resistance circuit network that is added to at least one input of the comparison amplifying circuit and fine-tunes a comparison input voltage, and plural open/close elements that are selectively continued in accordance with the contents of the second data memory and change a combined resistance value of the resistance circuit network, the continuity of the power transistor being controlled by the output of the comparison amplifying circuit, and the output voltage being negative-feedback-controlled to be a predetermined constant-voltage output Vcc proportional to the reference voltage Vs, a detection voltage of the analog sensor group is inputted to the multi-channel AD converter, and when the analog input voltage of the AD converter becomes equal to a reference voltage Vref supplied from the constant-voltage power supply circuit unit, the multi-channel AD converter generates a maximum digital output of predetermined resolution and selectively inputs digitally converted values of many analog inputs to the microprocessor, the temperature detector is formed by a thermosensitive element that is installed near the constant-voltage power supply circuit unit and that is fed from the constant-voltage power supply circuit unit to generate a temperature detection voltage corresponding to the temperature near the constant-voltage power supply circuit unit, and the output voltage correction data decides the combined resistance of the resistance circuit network so as to reduce the difference between the output voltage of the constant-voltage power supply circuit unit and a target voltage due to characteristic variation of components applied, wherein the output voltage correction data is unaltered data which is determined at a calibration operation;

the temperature calibration information reading and storing unit is a unit that writes and saves a digitally converted value of the detection voltage of the temperature detector at least at the time of transfer of the output voltage correction data, as calibration reference temperature data into the first or second data memory, the output voltage estimating unit is a unit that estimates the current output voltage of the constant-voltage power supply circuit unit by comparing the current detection output of the temperature detector with the calibration reference temperature data stored in the first or second data memory, and the error correcting unit is either an AD conversion value correcting unit that corrects the AD conversion value on the basis of the estimated output voltage and thus corrects an error of AD conversion output data.

2. The vehicle-borne electronic control device as claimed in claim 1, wherein the program memory or the first data memory contains voltage variation rate data, the voltage variation rate data is data of average voltage variation rate that is statistically calculated by actually measuring, in advance, the variation characteristics of output voltage in the case where the ambient temperature is changed with respect to many products, and the voltage variation rate data is stored from the external tool to the program memory or the first data memory, and the output voltage estimating unit estimates the current output voltage on the basis of the current output of the temperature detector and the voltage variation rate data.

3. The vehicle-borne electronic control device as claimed in claim 1, wherein the program memory further contains a program that provide an abnormal-temperature output voltage storing unit and an abnormal-temperature environment temperature data storing unit for an abnormal-temperature environment of a higher or lower temperature than the calibration reference temperature, the abnormal-temperature output voltage storing unit writes and saves the value of the externally measured voltage in the abnormal-temperature environment to the first or second data memory as an abnormal-temperature output voltage, the abnormal-temperature environment temperature data storing unit writes and saves the digitally converted value of the detected voltage of the temperature detector at the time when the abnormal-temperature output voltage is measured, to the first or second data memory, as an abnormal-temperature environment temperature, and the output voltage estimating unit calculates the output voltage at the current detected temperature from the correlation between the target output voltage of the constant-voltage power supply circuit unit or the externally measured voltage at the calibration reference temperature and the externally measured voltage at the abnormal-temperature environment temperature.

4. The vehicle-borne electronic control device as claimed in claims 1, wherein the program memory or the first data memory contains conversion processing data, the program memory also contains a program that provides an AD conversion value correcting unit, which is one of the error correcting units, the conversion processing data is average variation characteristic data that is statistically calculated by actually measuring, in advance, the variation characteristics of power supply voltage versus detected output voltage for a part or all of the analog signals inputted to the multi-channel AD convener, with respect to many analog sensors, and the variation characteristic data is stored from the external tool to the program memory or the first data memory, and the AD conversion value correcting unit is a detected value correcting unit that corrects the value of at least a part of the digitally convened voltages of the multi-channel AD convener on the basis of the current output voltage of the constant-voltage power supply circuit unit estimated by the output voltage estimating unit and the conversion processing data.

5. The vehicle-borne electroflic control device as claimed in claims 1, wherein the output voltage regulating circuit unit has a mediate setting memory, and the program memory further contains a program that provides an output voltage correcting unit, which is one of the error correcting units, the mediate setting memory, instead of the second data memory, performs continuity control of the open/close elements that perform variable control of the combined resistance of the resistance circuit network, and the output voltage correction data stored in the second data memory is transferred as an initial value to the mediate setting memory, and as a result, when the constant-voltage power supply circuit unit is at a reference ambient temperature, the open/close elements are selectively continued to generate a predetermined constant-voltage output Vcc, and the output voltage correcting unit calculates modified output voltage correction data corresponding to a differential voltage between the output voltage estimated by the output voltage estimating unit and a target output voltage, and performs algebraic addition of the modified output voltage correction data to the output voltage correction data stored in the mediate setting memory.

6. The vehicle-borne electronic control device as claimed in claim 1, wherein the output voltage regulating circuit unit has a variable setting memory and a variable resistance circuit network, in addition to the second data memory and the resistance circuit network, the program memory further contains a program that provides an output voltage correcting unit, which is one of the error correcting units, the variable setting memory is a non-volatile memory storing modified output voltage correction data for the constant-voltage power supply circuit unit to generate a predetermined constant-voltage output Vcc at a current ambient temperature, the variable resistance circuit network is added to at least one input of the comparison amplifying circuit and fine-tunes the comparison input voltage, and the variable resistance circuit network has plural open/close elements that change a combined resistance value of the resistance circuit network, and the open/close elements are selectively continued in accordance with the contents in the variable setting memory, and the output voltage correcting unit calculates modified output voltage correction data corresponding to a differential voltage between the output voltage estimated by the output voltage estimating unit and a target output voltage, and stores the modified output voltage correction data into the variable setting memory.

7. The vehicle-borne electronic control device as claimed in claim 1, wherein the output voltage regulating circuit unit is formed as a single integrated circuit device including at least a communication control circuit unit and a second multi-channel AD converter, the communication control circuit unit is serially connected with the microprocessor, and at the stage of component inspection of the integrated circuit device, the communication control circuit unit is serially connected with an external calibration tool, the external calibration tool is an inspection facility to write the output voltage correction data and at least the calibration reference temperature data at the time of calibration to the second data memory, and the second multi-channel AD converter is an AD converter that digitally converts the temperature near the constant-voltage power supply circuit unit detected by the temperature detector and inputs the digitally converted temperature to the communication control circuit unit.

8. The vehicle-borne electronic control device as claimed in claim 7, wherein the communication control circuit unit further includes an auxiliary program memory and an auxiliary RAM memory that cooperate with an auxiliary microprocessor, and all or a part of programs that provide the temperature calibration information reading and storing unit, output voltage estimating unit, and AD conversion value correcting unit or output voltage correcting unit, are stored in the auxiliary program memory, and these programs are executed by the auxiliary microprocessor instead of the microprocessor.

9. The vehicle-borne electronic control device as claimed in claim 1, wherein the program memory further contains a program that provides an externally measured voltage reading and storing unit, a calibration confirming unit, and correction data calculating and transfer units, the externally measured voltage reading and storing unit causes a highly accurate voltmeter provided outside of the vehicle-borne electronic control device to measure the output voltage of the constant-voltage power supply circuit unit, and transfers and temporarily stores the measured voltage into the RAM memory in the vehicle-borne electronic control device via the external tool, the calibration confirming unit reads out an externally measured voltage V10 measured by the highly accurate voltmeter and confirms whether the difference between the externally measured voltage V10 and a target value of the output voltage is corrected to fall within an allowable error range, when the result of the judgment by the calibration confirming unit shows that the difference is too large, the correction data calculating and transfer units are executed, and these units calculate correction data in response to a differential voltage between the externally measured voltage V10 and the target value of the output voltage, and transfer and rewrite the output voltage correction data into the second data memory, and the externally measured voltage reading and storing unit, the calibration confirming unit, and the correction data calculating and transfer unit constitute a calibration control unit executed in the inspection of components including at least the output voltage regulating circuit unit or in the adjustment operation of the vehicle-borne electronic control device.

10. The vehicle-borne electronic control device as claimed in claim 9, wherein the highly accurate voltmeter, which is the test inspection facility, is a voltmeter having accuracy equivalent to or higher than a minimum unit of the output voltage that can be regulated by the second data memory, and the measured voltage measured by the highly accurate voltmeter is read out and temporarily stored as digital data into the RAM memory by the externally measured voltage reading and storing unit via the external tool.

11. The vehicle-borne electronic control device as claimed in claim 9, wherein the calibration confirming unit further includes a re-transfer unit, at least one control unit of either a correction value limiting unit or a number-of-times-of-correction limiting unit, and an anomaly notifying unit, the re-transfer unit acts when the target difference confirmed by the calibration confirming unit is too large, and the re-transfer unit calculates correction data again in accordance with the differential voltage between the externally measured voltage V10 updated, read out and temporarily stored by the externally measured voltage reading and storing unit and the target value of the output voltage, and rewrites and transfers the new output voltage correction data to the second data memory, the correction value limiting unit stops the calibration operation when the correction value calculated by the correction data calculating unit exceeds a predetermined allowable value, and the number-of-times-of-correction limiting unit stops the calibration operation when the difference between the externally measured voltage V10 and the target value of the output voltage is not corrected to fall within the allowable error range even if the number of times of correction processing, update and transfer by the re-transfer unit exceeds a predetermined number of times, and the anomaly notifying unit acts when the correction value limiting unit or the number-of-times-of-correction limiting unit has stopped the calibration operation, and the anomaly notifying unit gives a warning and display of a calibration-disabled state to the external tool.

12. The vehicle-borne electronic control device as claimed in claim 9, wherein the correction data calculating unit transfers first and second output voltage correction data Daj1 and Daj2 to the second data memory as a tentative value, calculates differential voltages $\Delta V1 = V01-Vcc$ and $\Delta V2 = V02-Vcc$ between externally measured voltages V01 and V02 read out and stored by the externally measured voltage reading and storing units and the target value Vcc of the output voltage corresponding to the correction data Daj1 and Daj2, and calculates output voltage correction data Daj for a differential voltage of 0 by interpolation calculation based on the differential voltages $\Delta V1$ and $\Delta V2$ corresponding to the correction data Daj1 and Daj2.

* * * * *